(12) United States Patent
Beeler et al.

(10) Patent No.: US 9,036,898 B1
(45) Date of Patent: May 19, 2015

(54) HIGH-QUALITY PASSIVE PERFORMANCE CAPTURE USING ANCHOR FRAMES

(75) Inventors: Thabo Beeler, Zurich (CH); Bernd Bickel, Zurich (CH); Fabian Hahn, Regensdorf (CH); Derek Bradley, Zurich (CH); Paul Beardsley, Zurich (CH); Bob Sumner, Zurich (CH); Markus Gross, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 535 days.

(21) Appl. No.: 13/287,774

(22) Filed: Nov. 2, 2011

Related U.S. Application Data

(60) Provisional application No. 61/433,926, filed on Jan. 18, 2011.

(51) Int. Cl.
*G06T 17/00* (2006.01)

(52) U.S. Cl.
CPC .................................... *G06T 17/00* (2013.01)

(58) Field of Classification Search
CPC ....................................................... G06T 17/00
USPC ......................................................... 382/154
See application file for complete search history.

(56) References Cited

U.S. PATENT DOCUMENTS

| | | | |
|---|---|---|---|
| 2009/0003686 A1* | 1/2009 | Gu | 382/154 |
| 2009/0016435 A1* | 1/2009 | Brandsma et al. | 375/240.12 |
| 2009/0153655 A1* | 6/2009 | Ike et al. | 348/77 |
| 2010/0189342 A1* | 7/2010 | Parr et al. | 382/154 |
| 2010/0284607 A1* | 11/2010 | Van Den Hengel et al. | 382/154 |

OTHER PUBLICATIONS

High Resolution Passive Facial Performance Capture. Derek Bradley, Wolfgang Heidrich, Tiberiu Popa, and Alla Sheffer. Jul. 2010.*
Alexander, O., et al., "The digital emily project: photoreal facial modeling and animation," ACM SIGGRAPH, 2009, Courses 1-15.
Anuar, N., et al., "Extracting animated meshes with adaptive motion estimation," Proc. Vision, Modeling, and Visualization, 2004, pp. 63-71.
Beeler, T., et al., "High-quality single-shot capture of facial geometry," ACM Trans. Graphics, 2010, Proc. SIGGRAPH, 9 pages.

(Continued)

*Primary Examiner* — Stephen R Koziol
*Assistant Examiner* — Delomia Gilliard
(74) *Attorney, Agent, or Firm* — Kilpatrick Townsend & Stockton LLP

(57) ABSTRACT

High-quality passive performance capture using anchor frames derives in part from a robust tracking algorithm. Tracking is performed in image space and uses an integrated result to propagate a single reference mesh to performances represented in the image space. Image-space tracking is computed for each camera in multi-camera setups. Thus, multiple hypotheses can be propagated forward in time. If one flow computation develops inaccuracies, the others can compensate. This yields results superior to mesh-based tracking techniques because image data typically contains much more detail, facilitating more accurate tracking. Moreover, the problem of error propagation due to inaccurate tracking in image space can be dealt with in the same domain in which it occurs. Therefore, there is less complication of distortion due to parameterization, a technique used frequently in mesh processing algorithms.

21 Claims, 20 Drawing Sheets

(56) References Cited

OTHER PUBLICATIONS

Bickel, B., et al., "Multi-scale capture of facial geometry and motion," ACM Trans. Graphics, 2007, Proc. SIGGRAPH, vol. 33, pp. 10 pages.
Blanz, V., et al., "Reanimating faces in images and video," Computer Graphics Forum, 2003, Proc. Eurographics, vol. 22, No. 3, pp. 641-650.
Bradley, D., et al., "High resolution passive facial performance capture," ACM Trans. Graphics, 2010, Proc. SIGGRAPH, pp. 10 pages.
Decarlo, D., et al., "The integration of optical flow and deformable models with applications to human face shape and motion estimation," CVPR, 1996, vol. 231, pp. 8 pages.
Essa, I., et al., "Modeling, tracking and interactive animation of faces and heads using input from video," Proceedings of Computer Animation, 1996, vol. 68, pp. 12 pages.
Furukawa, Y., et al., "Dense 3d motion capture for human faces," CVPR, 2009, pp. 8 pages.
Guenter, B., et al., "Making faces," Computer Graphics, 1998, ACM Press, New York, SIGGRAPH 98 Proceedings, pp. 55-66.
Hernandez, C., et al., "Self-calibrating a real-time monocular 3d facial capture system," Proceedings International Symposium on 3D Data Processing, Visualization and Transmission, 2010, pp. 8 pages.
Kraevoy, V., et al., "Cross-parameterization and compatible remeshing of 3d models," ACM Trans. Graph., 2004, vol. 23, pp. 861-869.
Li, H., et al., "3-d motion estimation in model-based facial image coding," IEEE Trans. Pattern Anal. Mach. Intell., 1993, vol. 15, No. 6, pp. 545-555.
Lin, I. C., et al., "Mirror mocap: Automatic and efficient capture of dense 3d facial motion parameters from video," 2005, The Visual Computer, vol. 21, No. 6, pp. 355-372.
Ma, W., et al., "Facial performance synthesis using deformation-driven polynomial displacement maps," ACM Trans. Graphics, 2008, Proc. SIGGRAPH Asia, vol. 27, No. 5, 10 pages.
Pighin, F. H., et al., "Resynthesizing facial animation through 3d model-based tracking," ICCV, 1999, pp. 143-150.
Popa, T., et al., "Globally consistent space-time reconstruction," Eurographics Symposium on Geometry Processing, 2010, 10 pages.
Rav-Acha, A., et al., "Unwrap mosaics: A new representation for video editing," ACM Transactions on Graphics, 2008, SIGGRAPH Aug. 2008, 12 pages.
Sumner, R. W., et al., "Deformation transfer for triangle meshes," ACM Trans Graph., 2004, vol. 23, pp. 399-405.
Wand, M., et al., "Efficient reconstruction of nonrigid shape and motion from real-time 3d scanner data," ACM Trans. Graph, 2009, vol. 28, No. 2, pp. 1-15.
Wang, Y., et al., "High resolution acquisition, learning and transfer of dynamic 3-d facial expressions," Computer Graphics Forum, 2004, vol. 23, No. 3, pp. 677-686.
Williams, L., "Performance-driven facial animation," Computer Graphics, 1990, Proceedings of SIGGRAPH 90, vol. 24, pp. 235-242.
Winkler, T., et al., "Mesh massage," The Visual Computer, 2008, vol. 24, pp. 775-785.
Zhang, L., et al., "Spacetime faces: High resolution capture for modeling and animation," ACM Transactions on Graphics, 2004, vol. 23, No. 3, pp. 548-558.
Ekman, Paul, et al., "Facial Action Coding System, The Manual on CD Rom, HTML Demonstration Version," [online], published by A Human Face, 2002, ISBN 0-931835-01-1, [retrieved on Oct. 3, 2013], retrieved from the internet :<URL: http://face-and-emotion.com/dataface/facs/manual.html <, 8 pages.

* cited by examiner

HIGH-QUALITY PASSIVE PERFORMANCE CAPTURE USING ANCHOR FRAMES

CROSS-REFERENCES TO RELATED APPLICATIONS

This Application claims the benefit of and priority to U.S. Provisional Application No. 61/433,926, filed Jan. 18, 2011 and entitled "High-Quality Passive Facial Performance Capture Using Anchor Frames," the entire disclosure of which is hereby incorporated by reference for all purposes.

BACKGROUND

This disclosure relates to computer-generated imagery (CGI) and computer-aided animation. More specifically, this disclosure relates to techniques for high-quality passive performance capture using anchor frames.

With the wide-spread availability of computers, computer graphics artists and animators can rely upon computers to assist in production process for creating animations and computer-generated imagery (CGI). The production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

Therefore, one issue with the production process is the time and effort involved when a user undertakes to model the geometric description of an object and the model's associated avars, rigging, shader variables, paint data, or the like. It may take several hours to several days for the user to design, rig, pose, paint, or otherwise prepare a model that can be used to produce the visually desired look. This involvement in time and effort can limit that ability of the user to create even a single scene to convey a specific performance or to provide the desired visual effect. Additionally, artistic control over the look of a model or its visual effect when placed in a scene may also be lost by some attempts at reducing the time and effect in preparing a model that rely too much on automated procedural creation of models.

Thus, in CGI and computer-aided animation, games, interactive environments, synthetic storytelling, and virtual reality, performance capture is one research topic of critical importance as it can reduce the time and effect in preparing a model while preserving artistic control over the performance of the model. However, the complexity as well as the skills and familiarity in interpreting real-life performances make the problem exceptionally difficult. A performance capture result must exhibit a great deal of spatial fidelity and temporal accuracy in order to be an authentic reproduction of a real actor's performance. Numerous technical challenges, such as robust tracking under extreme deformations and error accumulation over long performances, contribute to the problem's difficulty.

Accordingly, what is desired is to solve one or more problems relating to performance capture techniques for use in CGI and computer-aided animation, some of which may be discussed herein. Additionally, what is desired is to reduce one or more drawbacks relating to performance capture techniques for use in CGI and computer-aided animation, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In one aspect, high-quality passive performance capture using anchor frames derives in part from a robust tracking algorithm. Tracking is performed in image space and uses an integrated result to propagate a single reference mesh to performances represented in the image space. Image-space tracking is computed for each camera in multi-camera setups. Thus, multiple hypotheses can be propagated forward in time. If one flow computation develops inaccuracies, the others can compensate. This yields results superior to mesh-based tracking techniques because image data typically contains much more detail, facilitating more accurate tracking. Moreover, the problem of error propagation due to inaccurate tracking in image space can be dealt with in the same domain in which it occurs. Therefore, there is less complication of distortion due to parameterization, a technique used frequently in mesh processing algorithms.

In various embodiments, methods for manipulating computer-generated objects can include receiving a plurality of images bounded by a first image and a second image. Tracking information is then generated for a third image in the plurality of images based on how a first portion of an actor's face in the first image corresponds in image space to a first portion of the actor's face in the third image and how a first portion of the actor's face in the second image corresponds in image space to a second portion of the actor's face in the third image. Information that manipulates a computer-generated object is generated based on the tracking information for the third image to reflect a selected portion of the actor's face in the third image.

In one aspect, generating the tracking information for the third image may include determining how the first portion of the actor's face in the first image corresponds incrementally in image space to a portion of the actor's face in each image in a set of images in the plurality of images that occur in a sequence of images in-between the first image and the third image. Generating the tracking information for the third image may further include determining how the first portion of the actor's face in the second image corresponds incrementally in image space to a portion of the actor's face in each image in of a set of images in the plurality of images that occur in a sequence of images in-between the second image and the third image.

In another aspect, generating the tracking information for the third image may include determining a first error associated with how the first portion of the actor's face in the first image corresponds in image space to the first portion of the actor's face in the third image. Generating the tracking information for the third image may further include determining a second error associated with how the first portion of the actor's face in the second image corresponds in image space to the second portion of the actor's face in the third image. On which of the first image and the second image to base in part the tracking information for the third image may be identified in response to a comparison between the first error and the second error.

In some embodiments, the second image satisfies similarity criteria associated with the first image. The first image and the second image may also satisfy similarity criteria associated with a reference image of the actor. In some aspects, tracking information for the first image in the plurality of images may be generated based on how a first portion of the actor's face in a reference image of the actor corresponds in image space to a second portion of the actor's face in the first image. Tracking information for the second image in the plurality of images maybe generated based on how a second portion of the predetermined image of the actor corresponds in image space to a second portion of the actor's face in the second image. The tracking information for the third image may further be generated based on at least one of the tracking information for the first image and the tracking information for the second image. Generating the tracking information for the first image or the second image may include a bi-directional comparison to and from one or more portions of the actor's face in the reference image of the actor.

In further embodiments, a first set of features is identified in the first image. A first set of features is then identified in the third image that corresponds to the first set of features in the first image. Information indicative of how the first portion of the actor's face in the first image corresponds in image space to the first portion of the actor's face in the third image can then be generated based on the first set of features in the third image that corresponds to the first set of features in the first image. In further aspects, a first set of features is identified in the second image. A second set of features is then identified in the third image that corresponds to the first set of features in the second image. Information indicative of how the first portion of the actor's face in the second image corresponds in image space to the second portion of the actor's face in the third image can then be generated based on the second set of features in the third image that corresponds to the first set of features in the second image. Identifying the first set of features in the first image or the second image may include identifying one or more of a pixel, an image structure, a geometric structure, or a facial structure.

In some embodiments, criteria is received configured to designate images as being similar to a reference image of the actor. In response to a sequence of images, the plurality of images may be generated as a clip bounded by the first image and the second image based on the criteria configured to designate images as being similar to the reference image of the actor.

In still further embodiments, generating the information that manipulates the computer-generated object to reflect the selected portion of the actor's face in the third image may include generating information configured to propagate a mesh from a first configuration to a second configuration. The information that manipulates the computer-generated object may further be modified in response to shape information associated with one or more portions of the actor's face in the third image. The information that manipulates the computer-generated object may further be modified in response to a measure of temporal coherence over a set of two or more images in the plurality of images that includes the third image.

In one embodiment, a non-transitory computer-readable medium storing computer-executable code for manipulating computer-generated objects includes code for receiving a plurality of images bounded by a first image and a second image, code for generating tracking information for a third image in the plurality of images based on how a first portion of an actor's face in the first image corresponds in image space to a first portion of the actor's face in the third image and how a first portion of the actor's face in the second image corresponds in image space to a second portion of the actor's face in the third image, and code for generating information that manipulates a computer-generated object based on the tracking information for the third image to reflect a selected portion of the actor's face in the third image.

In one embodiment, system for manipulating computer-generated objects includes a processor and a memory storing code for receiving a plurality of images bounded by a first image and a second image, code for generating tracking information for a third image in the plurality of images based on how a first portion of an actor's face in the first image corresponds in image space to a first portion of the actor's face in the third image and how a first portion of the actor's face in the second image corresponds in image space to a second portion of the actor's face in the third image, and code for generating information that manipulates a computer-generated object based on the tracking information for the third image to reflect a selected portion of the actor's face in the third image.

In a still further embodiment, for capturing facial performances and expressions of actors, a sequence of frames associated with one or more facial captures of an actor may be received. Each frame may include a plurality of stereo images. A mesh is generated for each frame in the sequence of frames that represents the facial position of all or part of the actor's face in the frame. One or more clips may be determined based on the sequence of frames and similarity criteria associated with one or more reference frames. Each clip in the plurality of clips is bounded by a first frame and a second frame that satisfy the similarity criteria associated with a reference frame in the one or more reference frames. A motion field may be determined for at least one frame in a first clip associated with a first reference frame based on an image space tracking of pixels between each image in the at least one frame and each image in the first frame of the first clip and between each image in the at least one frame and each image in the second frame of the first clip. Information that manipulates a mesh for the first reference frame of the first clip may be generated based on the motion field for the at least one frame in the first clip. In at least one aspect, determining the motion field for the at least one frame in the first clip may include determining a forward motion field and forward error from the image space tracking of pixels between each image in the at least one frame and each image in the first frame of the first clip and determining a backward motion field and a backward error from the image space tracking of pixels between each image in the at least one frame and each image in the second frame of the first clip. Either the forward motion field or the backward motion field may be selected based on whether the forward error or the backward error satisfies a predetermined threshold.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Introduction

Figure 1:
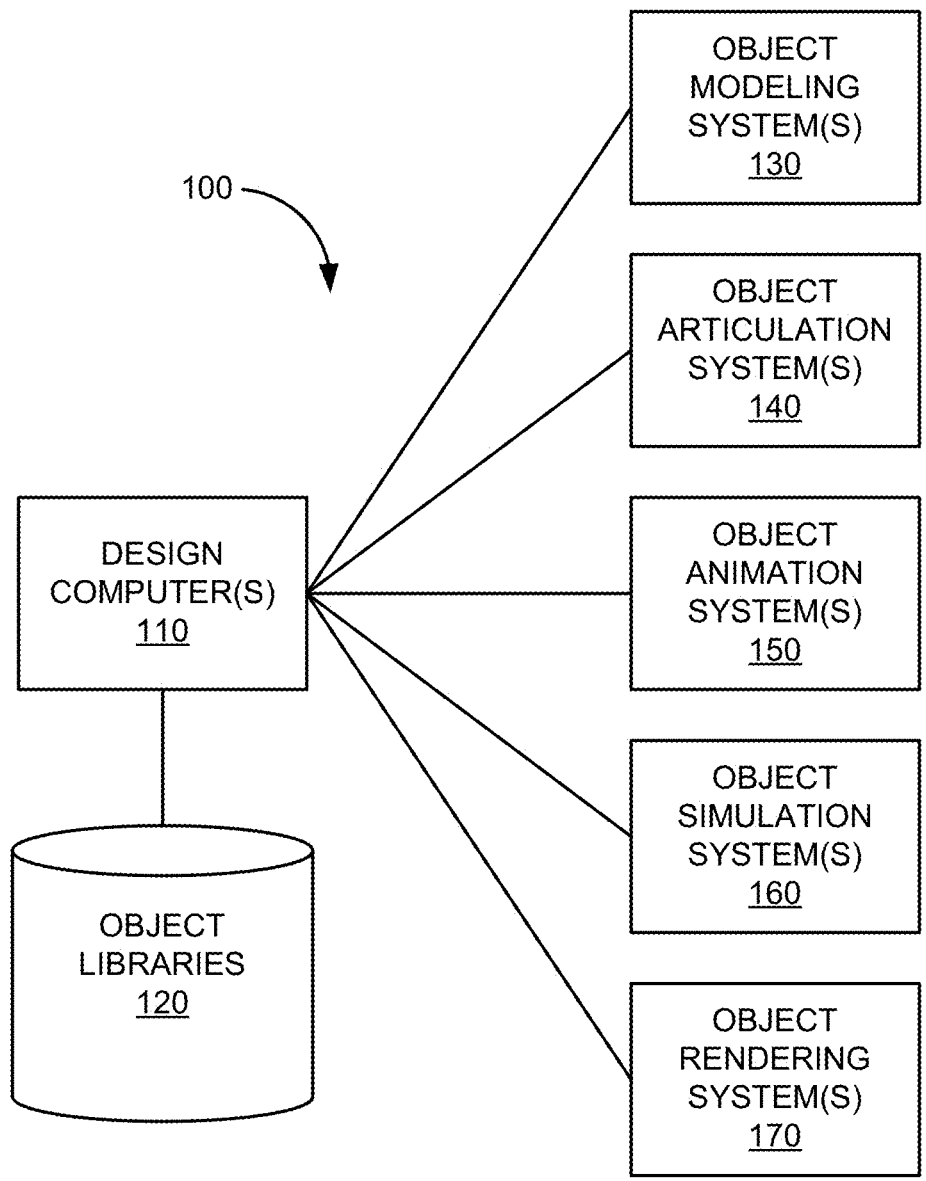
FIG. 1 is a simplified block diagram of a system for creating computer graphics imagery (CGI) and computer-aided animation that may implement or incorporate various embodiments or techniques disclosed herein for high-quality passive performance capture using anchor frames.

Performance capture techniques are disclosed that deliver a single, consistent mesh sequence deforming over time to precisely or substantially match actors' performances. Resulting meshes exhibit extremely fine pore-level geometric details, offering higher spatial fidelity than previously possible. The disclosed techniques are robust to expressive and fast performance motions, reproducing extreme deformations with minimal drift. Additionally, temporally varying textures can be derived directly from the captured performance without the need for the actor to utilize makeup or other markers. Computation is also designed to be parallelizable so that long sequences can be reconstructed efficiently using multi-core and multi-processor implementations.

In one aspect, high-quality results derive in part from a robust tracking algorithm. Tracking is performed in an image space obtained using a multi-camera setup and passive illumination and uses an integrated result to propagate a single reference mesh to performances represented in the image space. Image-space tracking is computed for each camera in the multi-camera setup. Thus, multiple hypotheses can be propagated forward in time. If one flow computation develops inaccuracies, the others can compensate. This yields results superior to mesh-based tracking techniques because image data typically contains much more detail, facilitating more accurate tracking. Moreover, the problem of error propagation due to inaccurate tracking in image space can be dealt with in the same domain in which it occurs. Therefore, there is no complication of distortion due to parameterization, a technique used frequently in mesh processing algorithms.

As suggested above, integration error can eventually accumulate when reconstructing long capture sessions. In another aspect, by employing an "anchor frame" concept long capture sessions and individual capture sessions taken at different times can be arranged into shorter sequences or clips. It can be observed that a lengthy performance typically contains main frames that are similar in appearance. For example, when speaking, an actor's face naturally returns to a resting pose between sentences or during speech pauses. In various embodiments, one frame (e.g., a frame that includes an actor in a resting pose or other desirable pose) is designated as a reference frame and then used to mark or otherwise identify as "anchor frames" all other frames similar to the reference frame. Due to the similarity between poses in the reference frame and the anchor frames, an image tracker can compute the flow from the reference frame to each anchor frame independently and with higher accuracy.

Additionally, each sequence between two consecutive anchors can be treated independently, integrating the tracking from both sides and enforcing continuity at the anchor boundaries. The accurate tracking of each anchor frame prevents error accumulation in lengthy performances. And, since the computation of the track between two anchors is independent, the process can be parallelized across multiple cores or CPUs. Accordingly, anchor frames can span multiple capture sessions of the same subject on different occasions without any additional special processing. This can be used to "splice" and "mix and match" unrelated clips, adding a powerful new capability to the editorial process.

Facial Animation

Data-driven facial animation has come a long way since the marker-based techniques introduced over two decades ago [Williams 1990; Guenter et al. 1998]. Current state of the art methods are now passive and almost fully automatic [Bradley et al. 2010; Popa et al. 2010]. However, a technique for capturing highly detailed expressive performances that completely avoids temporal drift has yet to be realized. Towards this goal, an anchored reconstruction approach is disclosed for capturing actor performances while limiting tracker drift and robustly handling occlusions and motion blur.

One approach to performance capture is to start with a deformable model (or template), for example of a face, and then determine the parameters that best fit the model from images or videos of a performing actor [Li et al. 1993; Essa et al. 1996; DeCarlo and Metaxas 1996; Pighin et al. 1999; Blanz et al. 2003]. Using this approach, the approximate 3D shape and pose of the deforming face can be determined. However, the deformable face tends to be very generic, so the resulting animations often do not resemble the captured actor. The face model must also be low-resolution for the fitting methods to be tractable, and so it is usually not possible to obtain the fine scale details that make a performance expressive and realistic.

Another common approach for performance capture is to track a sparse number of hand-placed markers or face paint using one or more video cameras [Williams 1990; Guenter et al. 1998; Lin and Ouhyoung 2005; Bickel et al. 2007; Furukawa and Ponce 2009]. While these techniques can yield robust tracking of very expressive performances and are usually suitable for a variety of lighting environments, the manual placement of markers can be tedious and invasive. Furthermore, the markers must be digitally removed from the videos if face color or texture is to be acquired. Also, the marker resolution is naturally limited, and detailed pore-scale performance capture has not been demonstrated with this approach.

An alternative to placing markers on the face is to project active illumination on the subject using one or more projectors [Wang et al. 2004; Zhang et al. 2004]. While this approach requires less manual setup, it can be equally invasive to the actor. Acquiring face color also poses a problem with these methods, as uniform illumination must be temporally interleaved with the structured light, sacrificing temporal resolution. A related active-light technique is proposed by Hernandez and Vogiatzis [Harnández and Vogiatzis 2010], who use tri-colored illumination with both photometric and multi-view stereo to obtain facial geometry in real-time, however without temporal correspondence. Finally, combining markers and structured light with an expensive light stage has proven to yield impressive facial performance capture results [Ma et al. 2008; Alexander et al. 2009].

Recently, research has focused on entirely passive capture, without requiring markers, structured light or expensive hardware. [Beeler et al. 2010] reconstruct pore-scale facial geometry for static frames. [Bradley et al. 2010] perform passive performance capture with automatic temporal alignment, but they lack pore-scale geometry and fail when confronted with expressive motions. Other passive deformable surface reconstruction techniques have been applied to faces [Wand et al. 2009; Popa et al. 2010]. [Wand et al. 2009] reconstruct from point cloud data by fitting a template model. However, their method tends to lead to loss of geometric detail which is necessary for realistic facial animation. This is partially resolved in recent work by [Popa et al. 2010] who use a gradual change prior in a hierarchical reconstruction framework to propagate a mesh structure across frames.

While image data, due to its superior resolution and detail, can be an enormous help in tracking 3D points over time, it is not always available, and sometimes just a sequence of 3D point clouds or incompatibly-triangulated 3D meshes are the input. A number of authors have addressed the problem of tracking a 3D mesh over time based on pure geometry. An early approach was described by [Anuar and Guskov 2004]. They start with an initial template mesh that is then propagated through the frames of the animation, based on a 3D adaptation of the Bayesian multi-scale differential optical flow algorithm. Since this flow is invariant to motion in the tangent plane, it is not able to eliminate "swimming" artifacts during the sequence. Inspired by the deformation transfer method of [Sumner and Popovic 2004], which allows to "copy and paste" mesh geometry from one shape to another, [Winkler et al. 2008] present an optimization method to track triangle geometry over time combining terms measuring data fidelity, and preservation of triangle shape. Shape preservation is achieved by the use of mean-value barycentric coordinates. This also addresses motion in the tangent plane, eliminating the artifacts present in the results of Anuar and Guskov.

Tracking triangle geometry is intimately related to the problem of cross-parameterization, or compatible remeshing of shapes, where the objective is to impose a triangle mesh representing one shape onto another, in a manner which minimizes distortion between the two. Not surprisingly, shape-preserving coordinates seem to be an effective tool in achieving this goal too, as demonstrated by [Kraevoy and Sheffer 2004].

More recent work by [Scharf et. al 2008] tracks pure geometry over time using a volumetric representation. The main idea behind their method is that the volume of an object should be approximately constant over time, thus the flow must be "incompressible". This assumption, along with other standard continuity assumptions, regularizes the solution sufficiently to provide a good track.

System Overview

Further to these works, techniques are provided for an anchor-based reconstruction with robust image-space tracking. A multi-camera setup and passive illumination are used to deliver a single, consistent mesh sequence deforming over time to precisely match actors' performances captured by the multi-camera setup. Resulting meshes exhibit extremely fine pore-level geometric details, offering higher spatial fidelity than previously possible. The disclosed techniques are robust to expressive and fast facial motions, reproducing extreme deformations with minimal drift. Additionally, temporally varying textures can be derived directly from the captured performance without the need for actors to utilize makeup or other markers. Computation is also designed to be parallelizable so that long sequences can be reconstructed efficiently using multi-core and multi-processor implementations. Thus, similar facial expressions in a sequence form anchor frames that are used to limit temporal drift, to match and reconstruct sequences in parallel, and to establish correspondences between multiple sequences of the same actor captured on different occasions.

FIG. 1 is a simplified block diagram of system 100 for creating computer graphics imagery (CGI) and computer-aided animation that may implement or incorporate various embodiments or techniques for high-quality performance capture using anchor frames. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

Passive Facial Performance Capture

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for high-quality passive performance capture.

In one aspect, system 100 receives input capturing an actor's performance. System 100 may receive a time-based sequence of one or more "frames." A "frame" means a set of one or more images acquired at one timestep. In various embodiments, each frame consists of a predetermined number of stereo images acquired at each timestep in a sequence. Based on input frames, system 100 generates an output as a sequence of meshes (e.g., 2D or 3D), one per frame, which move and deform in correspondence with the physical activity of the actor captured in a performance. According to some embodiments, each mesh vertex corresponds to a fixed physical point on the actor and maintains that correspondence throughout the sequence. Computation of the output meshes takes into account the image data, a prior on spatial coherence of the surface, and a prior on temporal coherence of the dynamically deforming surface.

Figure 2:
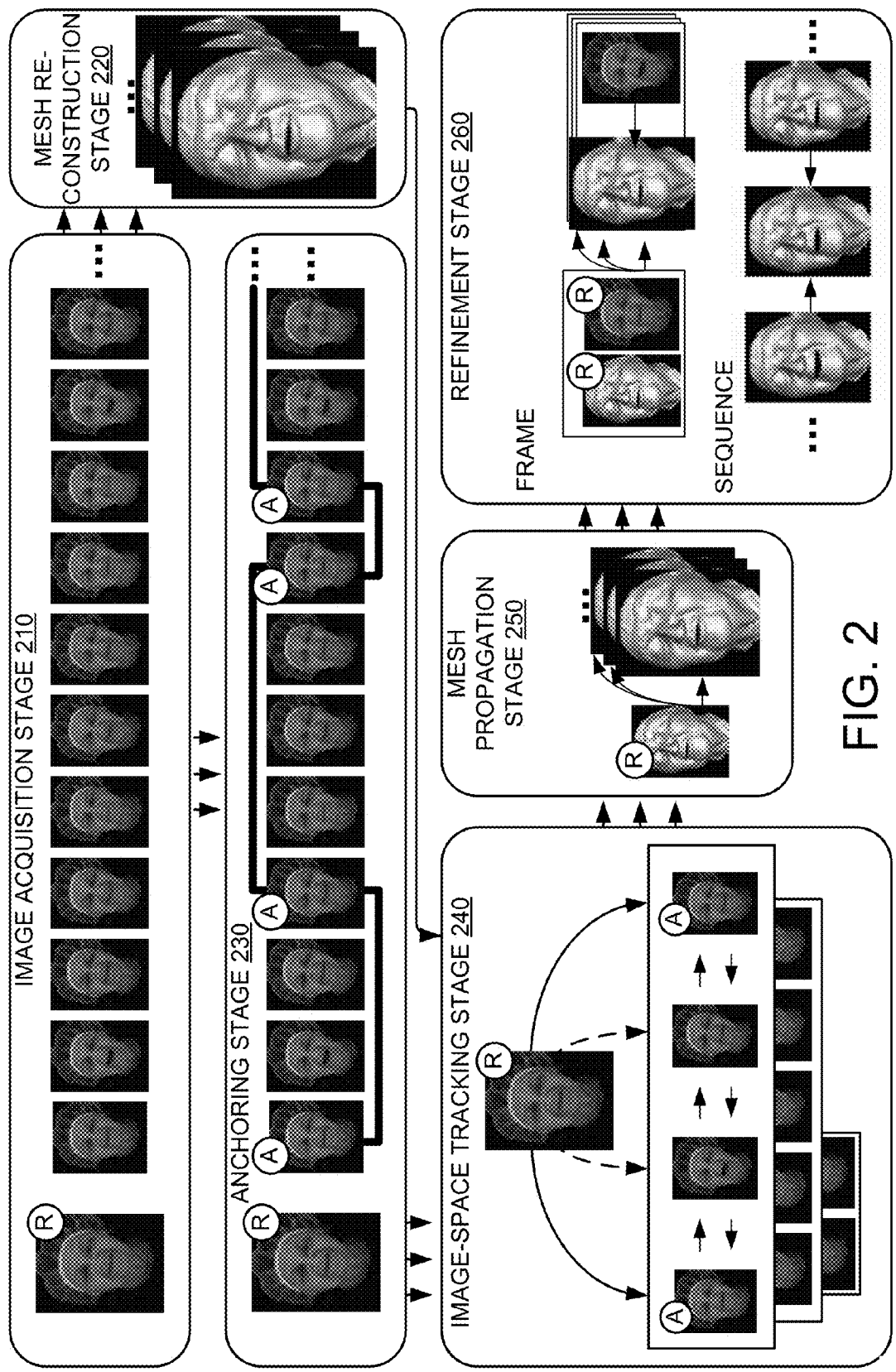
FIG. 2 is an illustration depicting stages of a high-quality passive performance capture process implemented by the system of FIG. 1 in one embodiment.

FIG. 2 is an illustration depicting stages of a high-quality passive performance capture process implemented by system 100 of FIG. 1 in one embodiment. The exemplary high-quality passive performance capture process of FIG. 2 includes image acquisition stage 210, mesh reconstruction stage 220, anchoring stage 230, image-space tracking stage 240, mesh propagation stage 250, and refinement stage 260.

In general, in image acquisition stage 210, system 100 receives sequences of frames from one or more capture sessions. In mesh reconstruction stage 220, each frame in a sequence of frames is processed (e.g., independently) to generate a first estimate for geometry (e.g., a mesh) of the frame corresponding to each of one or more objects represented in the frame (actors, actor faces and parts, animals, inanimate objects, etc.). In anchoring stage 230, one frame is identified as a reference frame (e.g., marked "R" in FIG. 2). Frames in the sequences from the one or more capture sessions that satisfy similarity criteria associated with the reference frame, such as having similar image appearance (e.g., similar features, facial expressions, head orientations, etc.) are detected automatically and marked or otherwise labeled as anchor frames (e.g., marked "A" in FIG. 2). Anchor frames provide a way to partition the sequences of frames from the one or more capture sessions into clips of frames for further processing.

In image-space tracking stage 240, one goal is to track features from the reference frame (e.g., image data such as pixels, lines, curves or objects in the image data such as shapes, detected structures, facial features, etc.) to corresponding features in each frame in the sequences of frames from the one or more capture sessions. For example, given that a frame $F_t$ is a collection of images $I_c^t$ of a set of cameras c=1 ... n at time t, tracking features from frame $F_t$ to frame $F_{t'}$ means tracking features in each image pair $(I^t, I^{t'})_c$ of all cameras c. One of the most straightforward approaches is to begin by tracking features from the reference frame to the anchor frames, because the image appearance in both frames is, by definition, similar. This then can be used to guide the tracking of features from the reference frame to all other frames in a specific sequence of frames.

In mesh propagation stage 250, the tracked features obtained in image-space tracking stage 240 provide a way to propagate geometry associated with the reference frame to all frames in the sequence. "Mesh propagation" of a reference mesh is used to mean the computation of new positions in space of the mesh vertices, in correspondence with physical movement of a captured performance. In refinement stage 260, each propagation of the geometry associated with the reference frame to each frame in the sequence provides an initial estimate for a refinement process that then updates the geometry (e.g., mesh vertices), enforcing consistency with the image data while applying priors on spatial and temporal coherence of the deforming surface.

Thus, system 100 can receive information capturing an actor's performance and generate an output as a sequence of meshes (e.g., 2D or 3D), one per captured frame, of the actor's performance which move and deform in correspondence with the physical activity of the actor captured in the performance and which further take into account a prior on spatial coherence of any dynamically deforming surface and a prior on temporal coherence.

Initial Meshes

Figure 3:
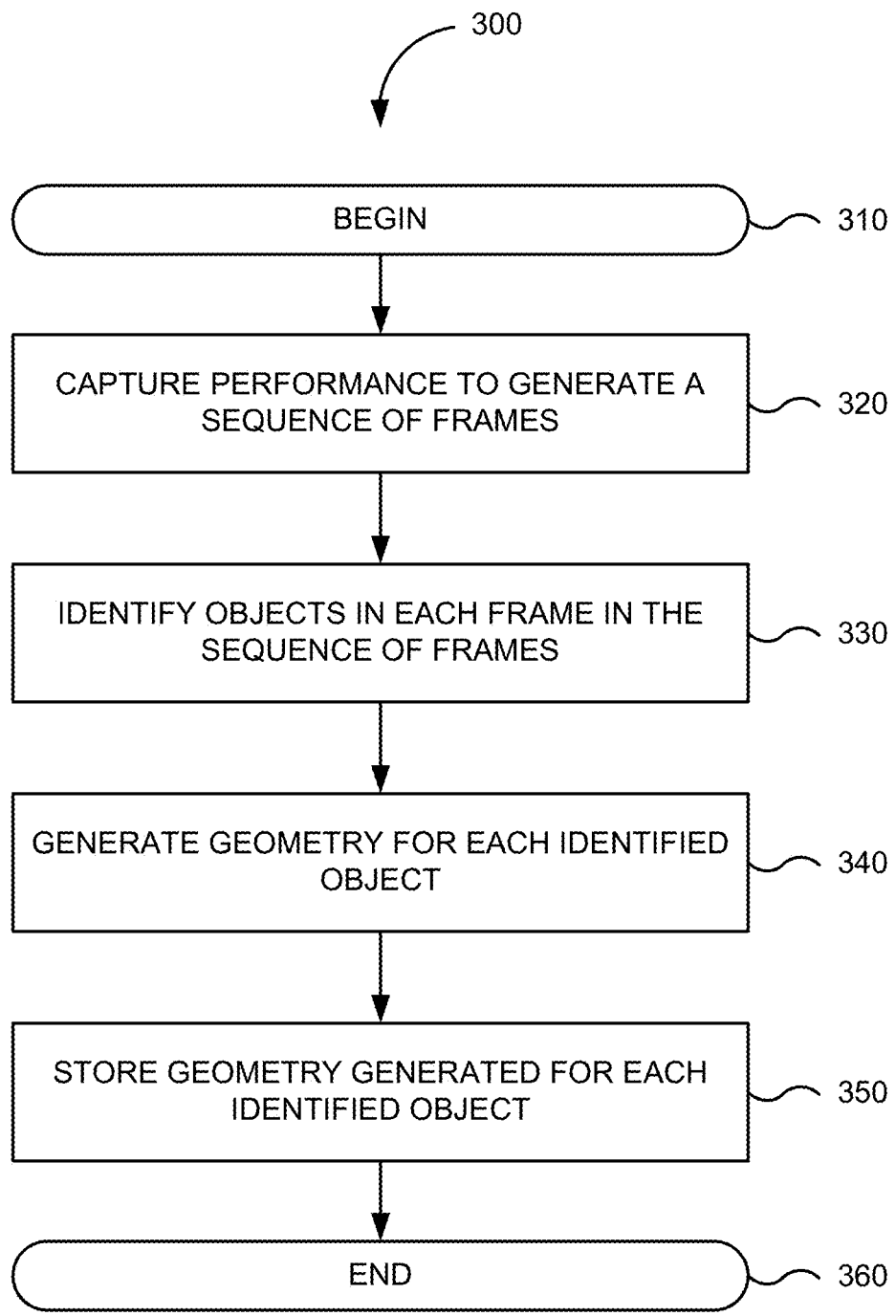
FIG. 3 is a flowchart of a method for constructing geometry associated with objects in images of a captured performance in one embodiment.

FIG. 3 is a flowchart of method 300 for constructing geometry associated with objects in images of a captured performance in one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, a performance is captured to generate a sequence of frames. For example, system 100 may receive input obtained from one or more capture sessions. In various embodiments, the one or more capture sessions can produce one or more sequences of one or more frames. Capture sessions can occur sequentially, with each capture sessions producing one or more sequences of frames capturing performances of the actor, where conditions (e.g., lighting, backgrounds, costumes, makeup, number of imaging sources, etc.) remain substantially similar from capture session to capture session. Capture sessions can also occur separately from one another such that conditions vary from one capture sessions to the next capture session.

As discussed above, each frame in a sequence of frames can include a set of one or more images. An image may include image data captured by an individual camera or by multiple cameras. Images may further include single image data, multiple image, data, stereo image data, and the like. Images forming a frame may include image data captured from imaging sources at different angles, perspectives, lighting conditions or filters, resolutions, and the like. Some images may include common image data while others may include image data capturing unique portions of an actor's performance.

In step 330, one or more objects are identified in each frame in the sequence of frames. For example, system 100 may employ one or more object identification techniques to identify objects in image data associate with a frame. Some object identification techniques can include computer-vision approaches, appearance-based matching, such as edge detection and shape identification, feature-based matching, template matching, gradient histograms, intraclass transfer learning, explicit and implicit object models, global scene representations, shading, reflectance, texture, grammars, biologically inspired object recognition, window-based detection, image data cues, and the like. In various embodiments, system 100 identifies one or more features of an object in each frame. Some examples of features can include image data features, such as pixels or subpixel, and more complex object features, such as object edges, object structures, and complex physical features (e.g., noses, ears, cheeks, mouth, etc.).

In step 340, geometry is generated for each identified object. For example, system 100 can generate information describing the geometry of an n-D shape. System 100 may generate geometric or mathematical descriptions that define points, lines, arcs, curves, triangles, rectangles, circles, composites, or any variety of polygons, and their connectivity. In some embodiments, system 100 generates a 3D polygonal mesh for each identified object using the 3D reconstruction method in [Beeler et al. 2010].

At this point, a sequence of meshes has been generated by system 100. There is no temporal correspondence in the resulting sequence of meshes, (i.e., their mesh structure (number of vertices and triangulation structure) is totally unrelated). As discussed further below, one goal of subsequent stages will be to modify the meshes so that they are compatible, (i.e., share a common vertex set and mesh structure). FIG. 3 ends in step 360.

Anchoring

In various embodiments, system 100 identifies and otherwise designates one frame in a sequence of frames as a reference frame. Thereafter, system 100 can automatically detect and label frames with similar image appearance (e.g., similar face expression and orientation) in the sequence and in other sequences as anchor frames. In one aspect, anchor frames partition a sequence of frames into clips as shown in FIG. 2. Anchoring is further utilized in image-space tracking at the level of each clip, reducing the need to track more lengthy sequences of frames.

Figure 4:
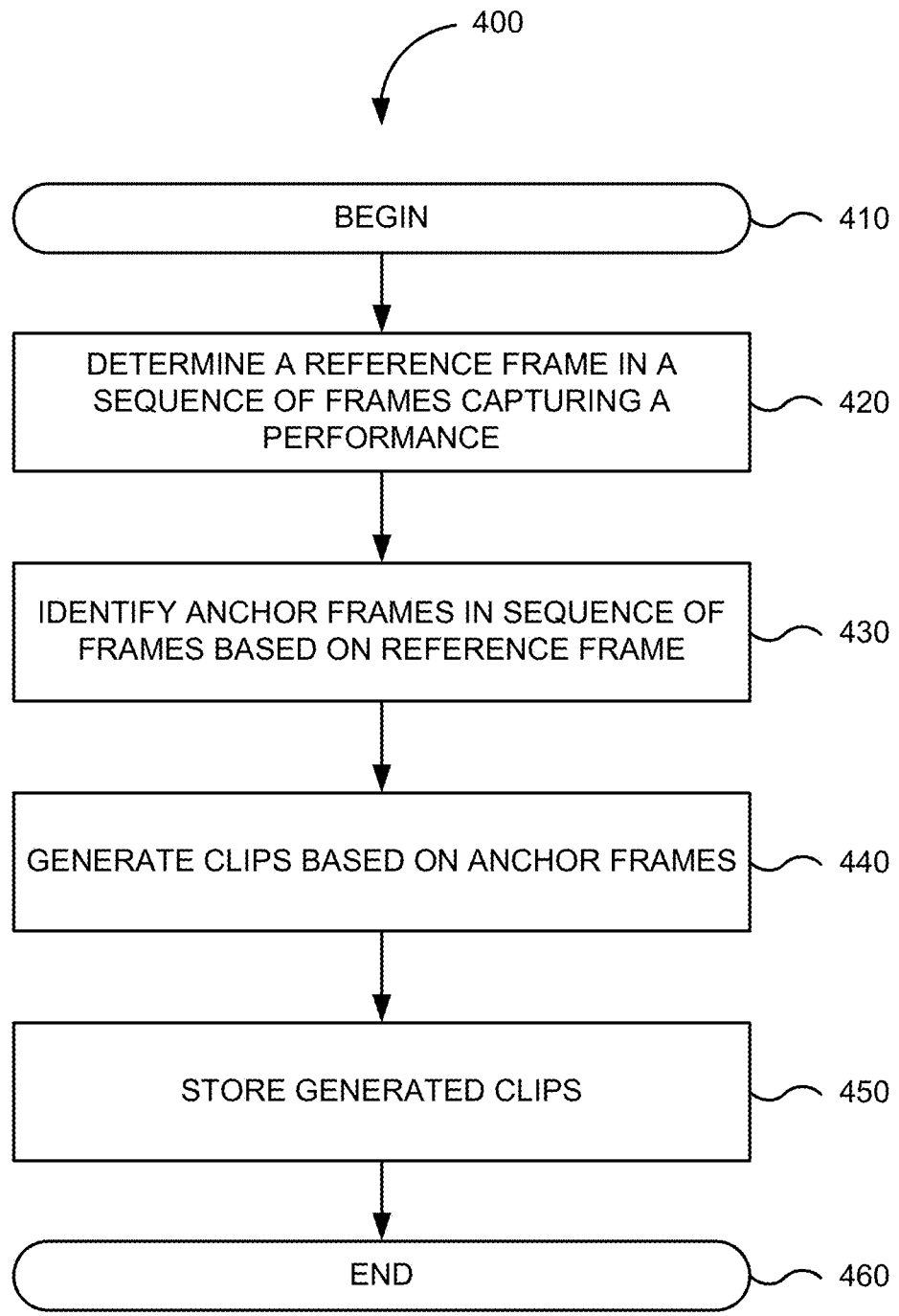
FIG. 4 is a flowchart of a method for generating image sequence clips of the captured performance based on a reference frame in one embodiment.

FIG. 4 is a flowchart of method 400 for generating image sequence clips of the captured performance based on a reference frame in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a reference frame in a sequence of frames capturing a performance is determined. For example, a reference frame can be chosen manually or procedurally using a variety of selection criteria. The reference frame then can produce anchor frames along the sequence whenever the actor's face returns to an expression in a target frame that is substantially similar to one in the reference frame. Some examples of selection criteria for a reference frame is whether an actor's face is in its natural rest expression or a desired pose. For example, a reference frame may be chosen based on a desired pose or look on an actor's face.

In step 430, anchor frames are identified in the sequence based on the reference frame. For example, frames that are similar to the reference frame are labeled as anchors. A frame can be deemed similar in one embodiment if features are present in both the frame and the reference frame. Similarity criteria may be used to determine how close a frame is to matching a reference frame. One method for identifying anchor frames is described further with respect to FIG. 5.

In step 440, clips are generated based on the anchor frame. A clip is a sequence of frames bounded by two anchor frames. In one aspect, an anchor frame might be both the last frame of one clip and the first frame of the next clip. A clip can include any number of frames in addition to the anchor frames. In step 450, the generated clips are stored. FIG. 4 ends in step 460.

Drift (or error accumulation) in tracking is a key issue when processing a long sequence. Anchor frames generated by system 100 provide a way to decompose sequences of frames obtained from one or more capture sessions into clips, effectively allowing multiple starting points for further processing while still having a common root in the reference frame. One immediate benefit of using anchor frames is that the clips they form naturally allow for parallelization of subsequent computations on the individual clips. Another important benefit is that using anchor frames results in periodic resets that prevent the accumulation of drift when tracking along a sequence. Using anchor frames also confines catastrophic failures in tracking, which could arise from occlusion/motion blur/face outside the image, to the frames in which they Occur.

Figure 5:
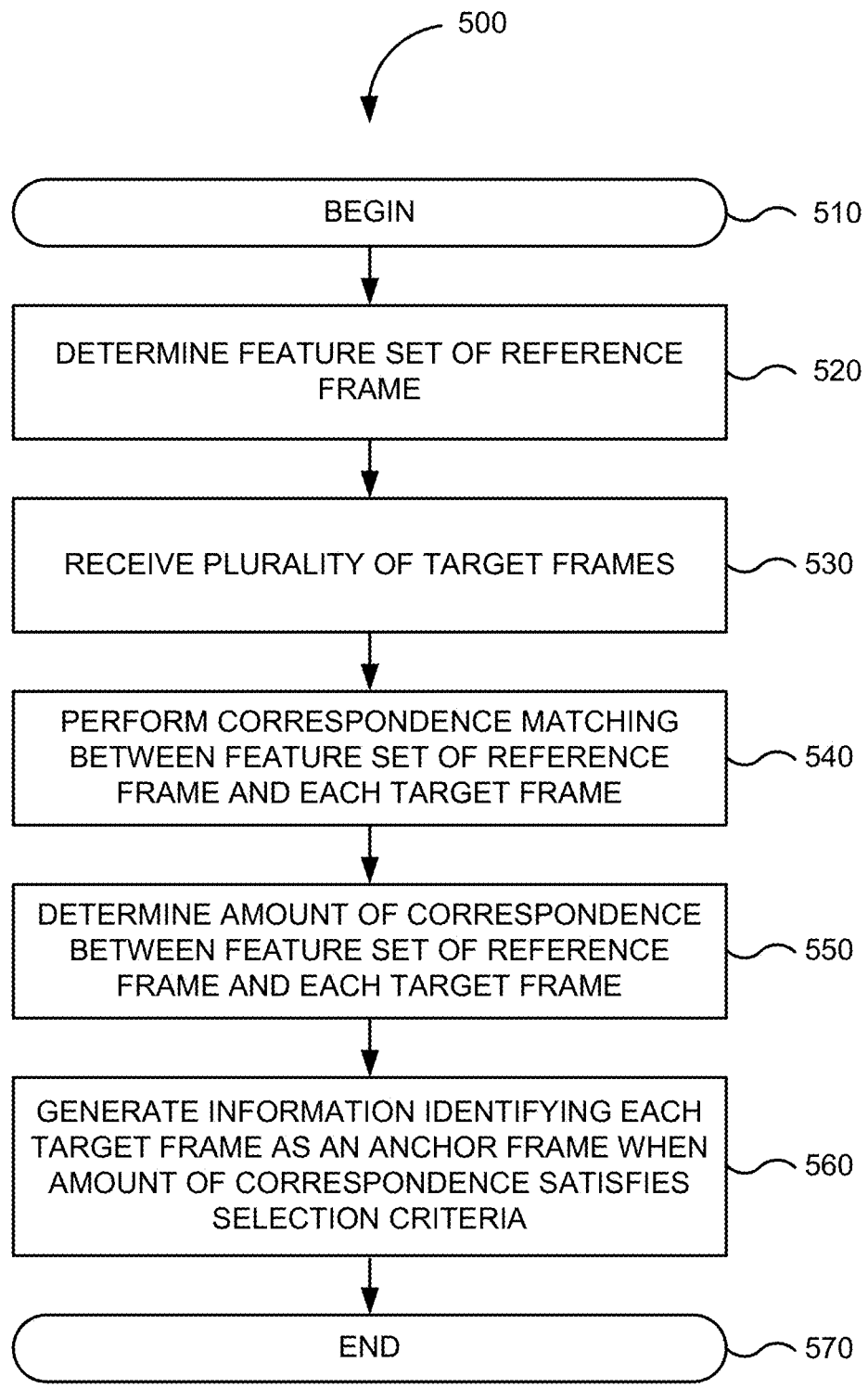
FIG. 5 is a flowchart of a method for identifying anchor frames of the clips using the reference frame in one embodiment.

FIG. 5 is a flowchart of method 500 for identifying anchor frames of clips using a reference frame in one embodiment. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 520, a feature set of a reference frame is determined. For example, system 100 detects a feature set $S_c$ in stereo image $I_c^R$ in a reference frame, for stereo cameras c=1 . . . n. A feature is a uniquely identifiable element of an image in the frame. Some examples of features include image data in the form of pixels, groups of pixels, lines, curves, edges, and the like. Other examples of features include objects represented in image data, such as structures, physical attributes of an object, distinguishable attributes of a form, body parts, and the like.

In step 530, a plurality of target frames is received. In step 540, correspondence matching is performed between the feature set of the reference frame and each target frame in the plurality of target frames. For example, system 100 performs a correspondence matching of $S_c$ between $I_c^R$ and $I_c^t$ in a target frame $F^t$, for stereo cameras c=1 . . . n. In step 540, an amount of correspondence is determined between the feature set of the reference frame and each target frame. In one embodiment, system 100 computes an error score E as a sum of cross-correlation scores over all features in all feature sets $S_c$.

In step 550, information identifying each target frame as an anchor frame is generated when the amount of correspondence satisfies selection criteria. Selection criteria may include how similar the reference frame is to each target frame (a vice-versa). FIG. 5 ends in step 560.

Figure 6:
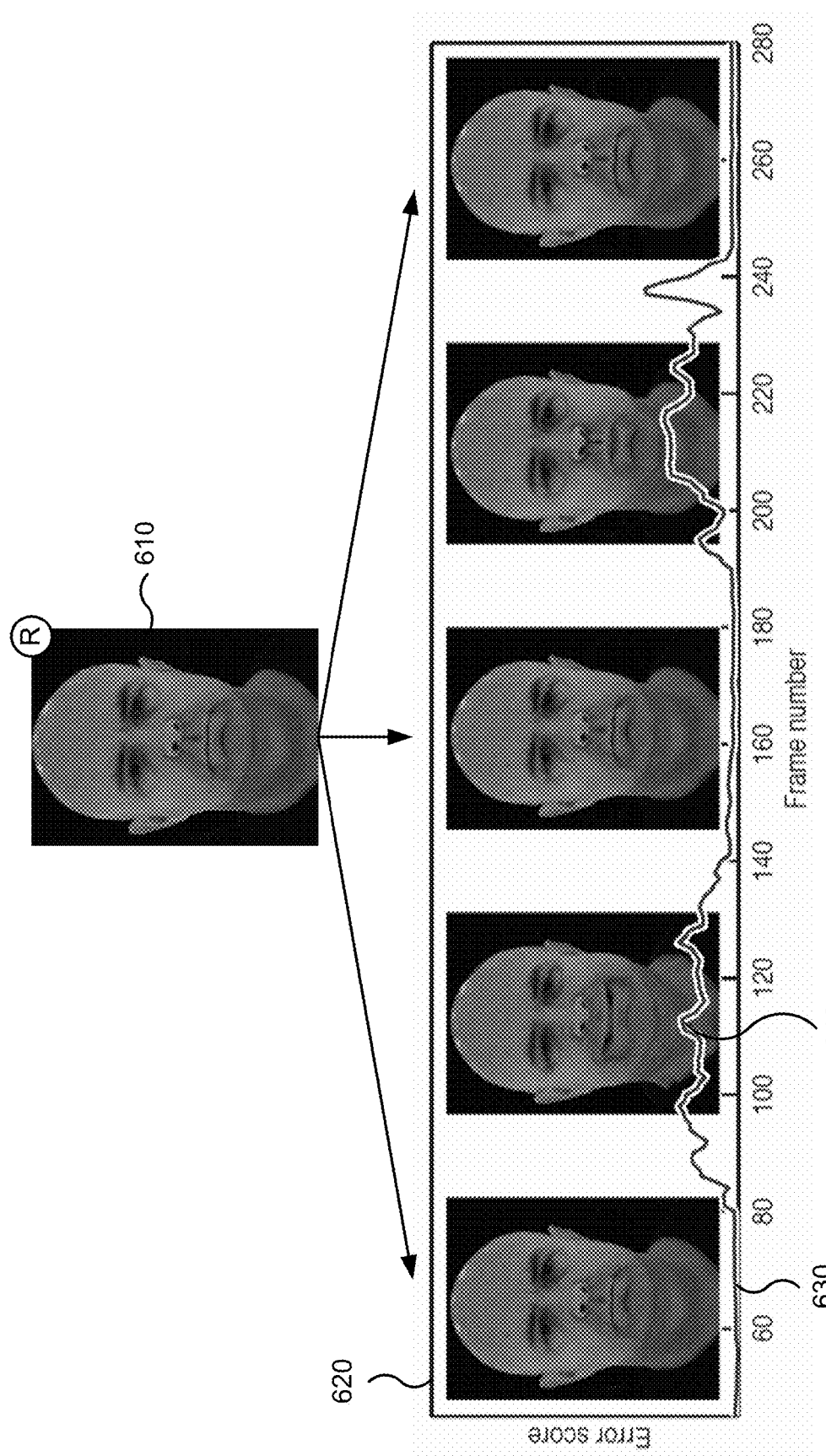
FIG. 6 is an illustration depicting results of a comparison between the reference frame and individual frames in the captured performance used to identify anchor frames in one embodiment.

FIG. 6 is an illustration depicting results of a comparison between reference frame 610 and sequence 620 of individual frames in a captured performance used to identify anchor frames in one embodiment. In this example, reference frame 610 is compared with all frames in sequence 620. Variation in E is shown for a few example frames. Specifically, for several frame surrounding frame number 60 the variation in E is small as indicated by a relatively low error score 630. For several frames between frames 100 to 120, the variation in E is larger as indicated by a relatively larger error score, such as score 640. Thus, frames where the image appearance is similar to reference frame 610 can be labeled as anchor frames.

Figure 7:
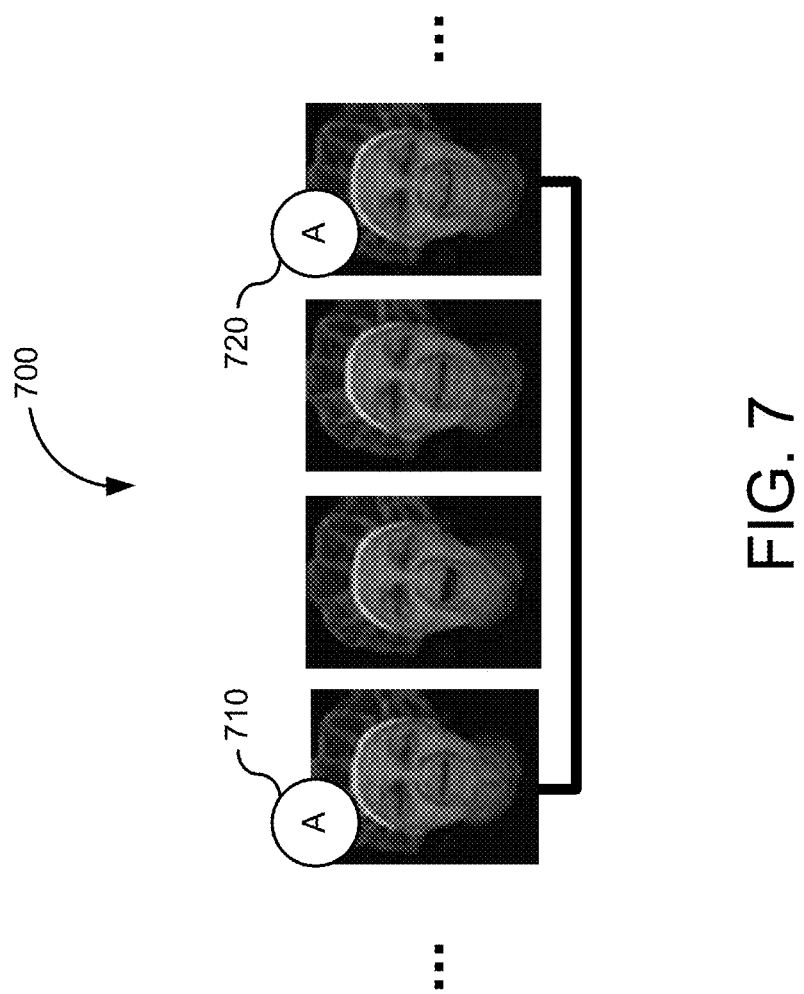
FIG. 7 is an illustration of an exemplary clip in one embodiment having anchor frames corresponding to the reference frame.

FIG. 7 is an illustration of clip 700 in one embodiment having anchor frames 710 and 720 corresponding to a reference frame.

Image-Space Tracking

As discussed above, one goal of image-space tracking is to track image features from a reference frame to each frame in a sequence. There can be two distinct situations for matching. For example, anchor frames by definition have similar image appearance to the reference frame. Thus image correspondence can be straightforward. Unanchored frames, however, may be quite different from the reference and may not be reliably matched directly.

Figure 8:
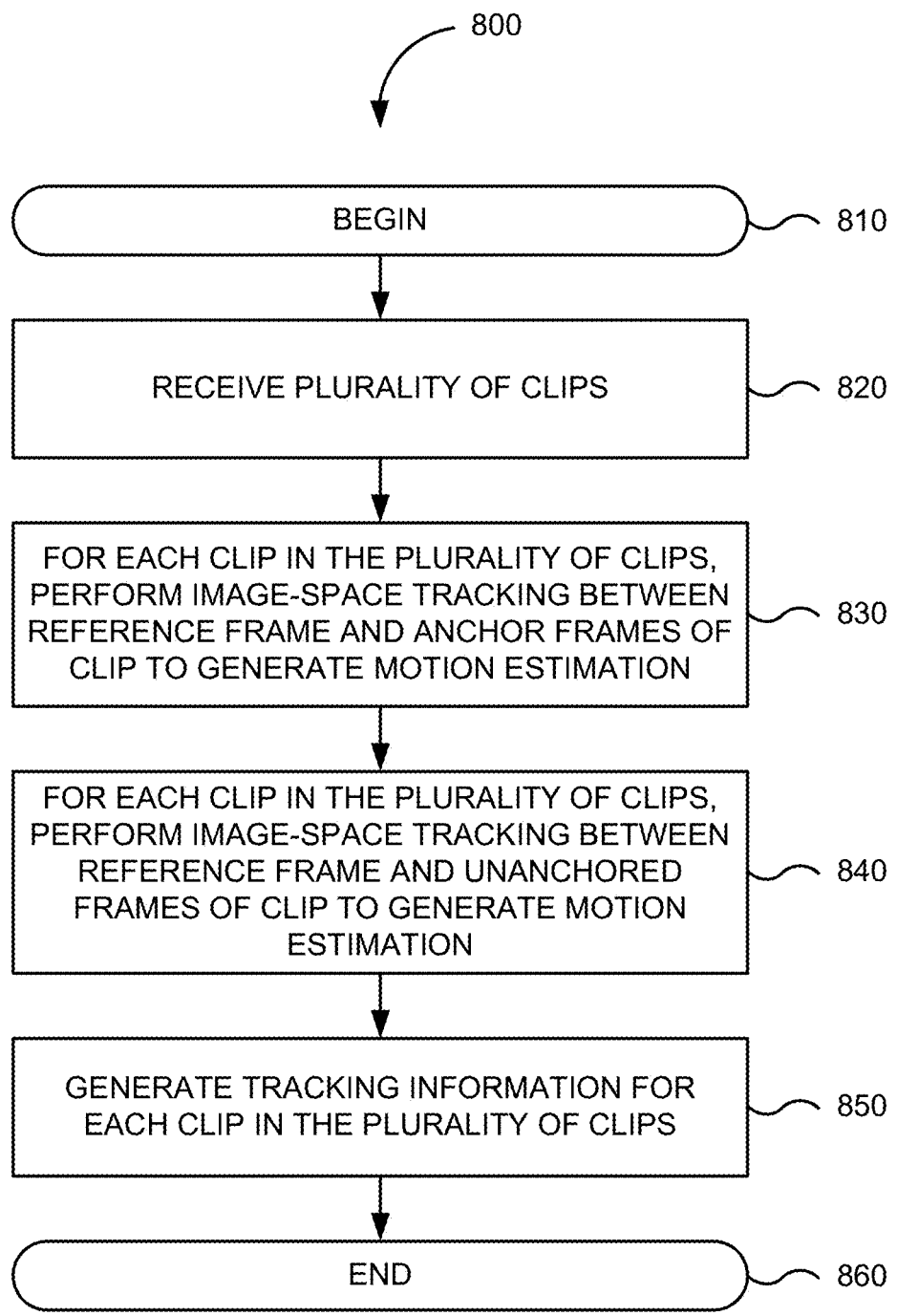
FIG. 8 is a flowchart of a method for performing image-space tracking of clips of the captured performance in one embodiment.

FIG. 8 is a flowchart of method 800 for performing image-space tracking of clips of a captured performance in one embodiment. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 820, a plurality of clips are received. In step 830, for each clip in the plurality of clips, image-space tracking is performed between a reference frame and anchor frames of the clip to generate a motion estimation. In various embodiments, correspondences from the reference frame are first obtained for the anchor frames. Correspondences then can be obtained from the anchor frames for the reference frame. One example of a method for performing image-space tracking between a reference frame and anchor frames of a clip is discussed further with respect to FIG. 9. In various embodiments, system 100 generate the motion estimation to include information providing how a set of features in the reference frame move between the reference frame and the anchor frames. This can include rigid body motions as well has changes in shape.

In step 840, for each clip in the plurality of clips, image-space tracking is performed between the reference frame of the clip and unanchored frames to generate a motion estimation. In one aspect, the correspondences from the reference frame to the anchor frames are propagated from the anchor frames bounding the clip to the intermediate unanchored frames within the clip, both forwards and backwards. One example of a method for performing image-space tracking between a reference frame and unanchored frames of a clip is discussed further with respect to FIG. 10.

In step 850, tracking information is generated for each clip in the plurality of clips. An immediate benefit of this technique is that it naturally allows parallelization of the computations. FIG. 8 ends in step 860.

Figure 9:
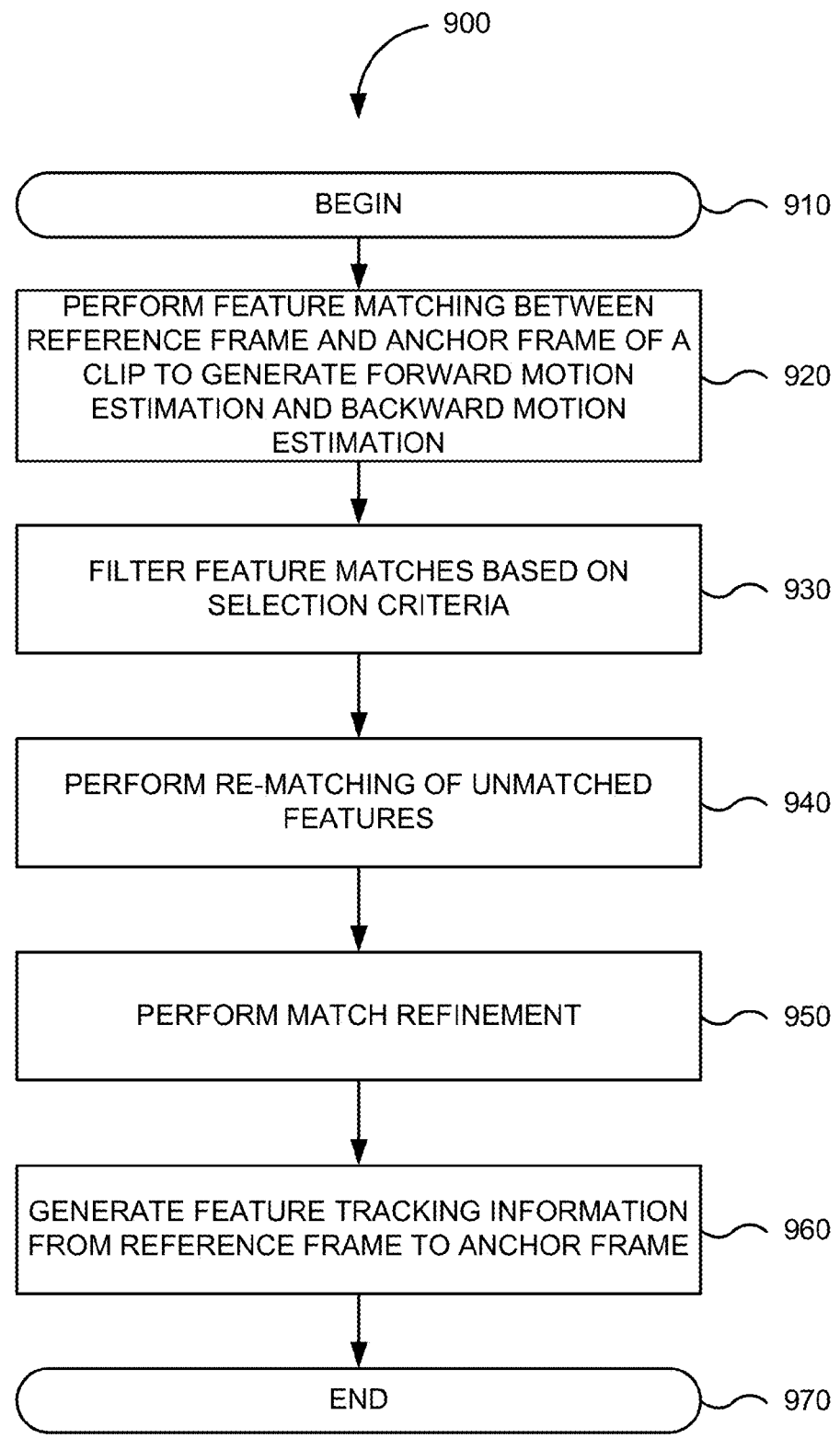
FIG. 9 is a flowchart of a method for performing image-space tracking between a reference frame and anchor frames of a clip in one embodiment.

FIG. 9 is a flowchart of method 900 for performing image-space tracking between a reference frame and anchor frames of a clip in one embodiment. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 920, feature matching is performed between a reference frame and an anchor frame of a clip to generate a forward motion estimation and a backward motion estimation. For example, the orientation and expression of a face in anchor frames may be similar to that in an reference frame, but its location within the frame might differ substantially. Thus, system 100 performs feature matching to determine any changes in locations within the frame of corresponding features.

In some embodiments, system 100 uses an image pyramid to detect motions of corresponding features. System 100 may start the process at a coarsest level of a pyramid and match a sparse set of features to estimate extremal motions $m^{\pm}$, followed by a dense motion estimation method using a search window of size $[(m_x^+ - m_x^-) \times (m_y^+ - m_y^-)]$. System 100 then may upsample the resulting motion field to the next higher resolution where dense motion estimation is repeated with a search window of fixed size (e.g., 3×3). System 100 repeats until the highest resolution layer is reached. This is done for each anchor frame to provide the motion fields $u_c^{R \to A}$ from the reference frame R to anchor frame A for stereo cameras c=1 . . . n.

In one embodiment, system 100 provides a motion estimation as an extension to 2D of the matching introduced in [Beeler et al. 2010]. For example, system 100 matches feature x (e.g., a pixel) in image $I_c^R$ to one or more features x' in image $I_c^A$. System 100 may match features defined as pixels using a block-based normalized cross-correlation (e.g., with the above 3×3 search window). Based on these matches, system 100 generates a forward motion estimation u=x−x'. System 100 also matches feature y in image $I_c^A$ to one or more features y" in image $I_c^R$. System may match features defined as pixels again using a block-based normalized cross-correlation (e.g., with the above 3×3 search window). Based on these matches, system 100 generates a backward motion estimation v=y−y'.

In step 930, feature matches are filtered based on selection criteria. Feature matches may be filtered for further processing, either as confirmed matches or for re-matching. For example, system 100 may not accept a match between a feature in image $I_c^R$ and a feature in image $I_c^A$ that fails to satisfy the selection criteria. In one embodiment, system 100 discards matches where ||u+v|| is larger than a predetermined threshold (e.g., one pixel). In step 940, re-matching is performed for unmatched features. For example, system 100 may again perform a cross-correlation between features in image $I_c^R$ and features in image $I_c^A$. In some aspects, system 100 may utilize neighboring and confirmed matches for guidance.

In step 950, match refinement is performed. For example, system 100 may refine computed matches using one or more refinement terms or criteria. Some examples of refinement terms or criteria are photometric consistency of a match between a plurality of images and depth maps. Depth maps can be obtained from initial geometry determined mesh reconstruction stage 220 of FIG. 2 and FIG. 3 and reprojected back onto a set of images.

One formulation of refined motion in [Beeler et al. 2010] includes a convex combination u'=(w$_p$u$_p$+w$_s$u$_s$)/(w$_p$+w$_s$). This formulation, in one aspect, is extended such that the regularization term u$_s$ is modified based on a depth map δ and a matching error ξ.

$$u_s(x, y) = \sum_{(x',y') \in N(x,y)} w_{x',y'} \cdot u_{x',y'}$$

where $$w_{x',y'} := \exp\left(\frac{\|\delta_{x',y'} - \delta_{x,y}\|^2}{\delta^2}\right)(1 - \xi_{x',y'})$$

and N denotes the neighborhood of (x, y). The value of δ may be defined as a predetermined depth range, (e.g., 1 mm).

In step 960, feature tracking information from the reference frame to the anchor frame is generated. The feature tracking information can include information describing how a feature moves or otherwise is transformed between the reference frame and the anchor frame. Accordingly, system 100 may detect motions, transformations, shape changes, etc. of corresponding features to provide, for example, motion fields u$_c^{R \to A}$ from the reference frame R to anchor frame A. FIG. 9 ends in step 970.

Figure 10:
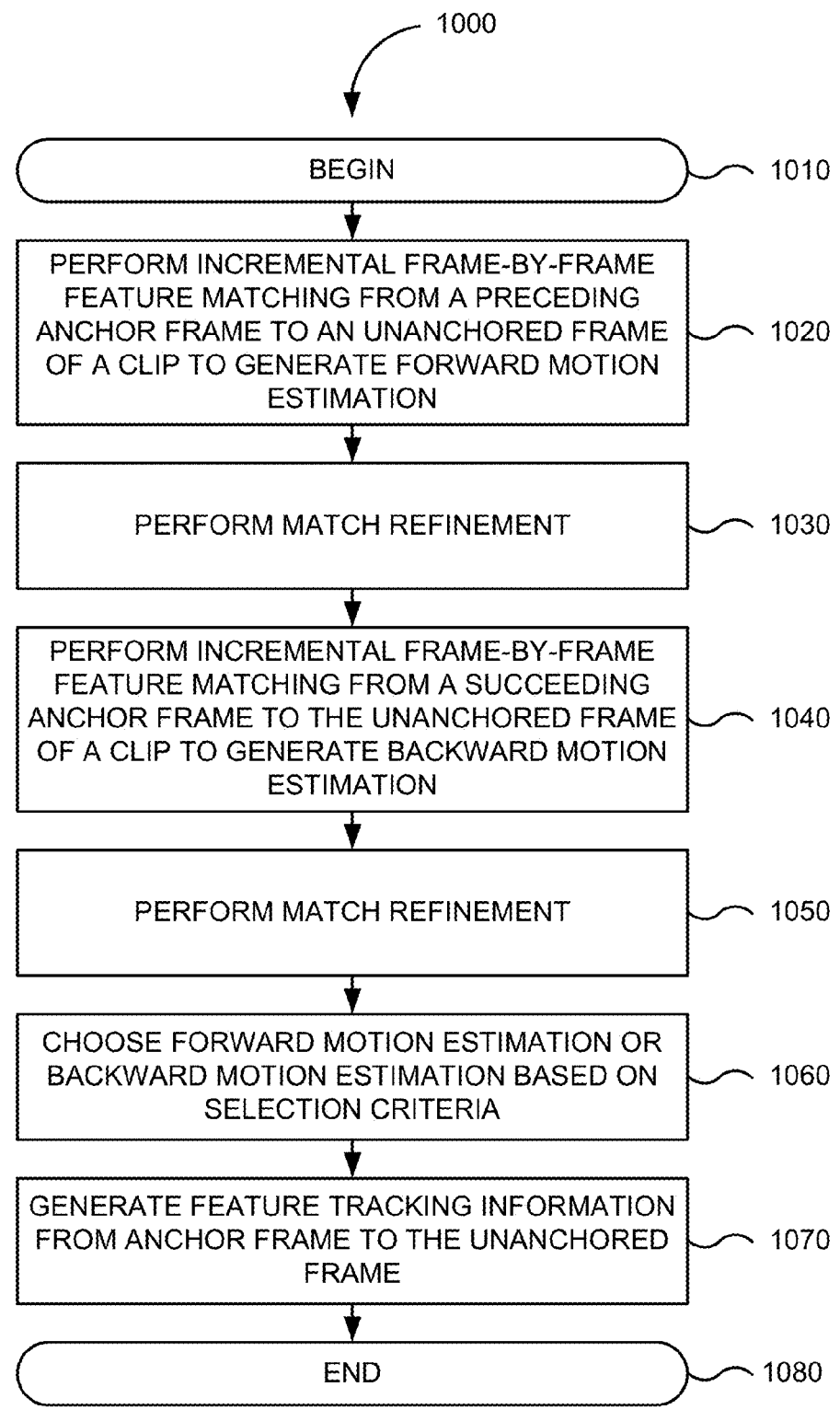
FIG. 10 is a flowchart of a method for performing image-space tracking between a reference frame and unanchored frames of a clip in one embodiment.

FIG. 10 is a flowchart of a method for performing image-space tracking between a reference frame and unanchored frames of a clip in one embodiment. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

Direct tracking of features from a reference frame to unanchored frames of a clip is not reliable because image appearance can differ substantially between the two. Instead, in various embodiments, system 100 utilizes the matching between the reference frame and the anchor frames to aid the process. Frames are tracked incrementally within a clip starting from the relevant anchor frames. Feature tracking information from the reference frame to the anchor frame, plus any incremental frame-to-frame matching, is then used by system 100 to infer feature tracking from the reference frame to each individual unanchored frame.

In step 1020, incremental frame-by-frame feature matching is performed from a preceding anchor frame to an unanchored frame of a clip to generate a forward motion estimation. For example, system 100 performs frame-by-frame feature matching (e.g., using a similar image-space tracking technique as described above with respect to FIG. 9) starting from an anchor frame I$_c^A$ to the next frame in the clip I$_c^i$. The process repeats with each intermediate clip beginning from the anchor frame until reaching the target unanchored frame I$_c^t$. Thus, starting from a preceding anchor frame in the clip from the unanchored frame, system 100 generates a forward motion estimation for the unanchored frame:

$$u_c^{R \to t} = u_c^{R \to A} + \sum_{i < t} u_c^{j \to i+1}$$

In step 1030, match refinement is performed. For example, system 100 may refine computed matches using one or more refinement terms or criteria, such as described about with respect to FIG. 9. In some aspects, this allows system 100 to correct the motion field for small drift with respect to the reference frame (track-to-first principle).

In step 1040, incremental frame-by-frame feature matching is performed from a succeeding anchor frame to the unanchored frame of the clip to generate a backward motion estimation. For example, system 100 performs frame-by-frame feature matching (e.g., using a similar image-space tracking technique as described above with respect to FIG. 9) starting from an anchor frame I$_c^A$ to the next frame in the clip. The process repeats with each intermediate clip beginning from the anchor frame until reaching the target unanchored frame I$_c^t$. Thus, starting from a succeeding anchor frame in the clip from the unanchored frame, system 100 generates a backward motion estimation for the unanchored frame:

$$u_c^{R \to t} = u_c^{R \to A} + \sum_{i > t} u_c^{j \to i-1}$$

In step 1050, match refinement is performed. Again, for example, system 100 may refine computed matches using one or more refinement terms or criteria, such as described about with respect to FIG. 9.

In step 1060, the forward motion estimation or the backward motion estimation is chosen based on selection criteria. Specifically, a bi-directional matching (e.g., both a forward and backward matching) is performed. Each clip is bound by a start and end anchor frame, and system 100 performs feature tracking from the start anchor in the forward direction and from the end anchor in the backward direction. As the forward and backward motion fields may differ due to error, system 100 chooses one to suitably represent feature motion. In one embodiment, system 100 resolves the selection by computing an error field for each motion field, smoothing the error fields to remove local perturbation, and then taking lowest smoothed error to obtain the best match at each feature.

In step 1070, feature tracking information from anchor frame to the unanchored frame is generated. The feature tracking information can include information describing how a feature moves or otherwise is transformed between the reference frame and the chosen anchor frame and intermediate frames (e.g., either forward or backward motion selection). Accordingly, system 100 may detect motions, transformations, shape changes, etc. of corresponding features to provide, for example, motion fields u$_c^{R \to t}$ from the reference frame R to the unanchored frame t. FIG. 10 ends in step 1080.

Figure 11:
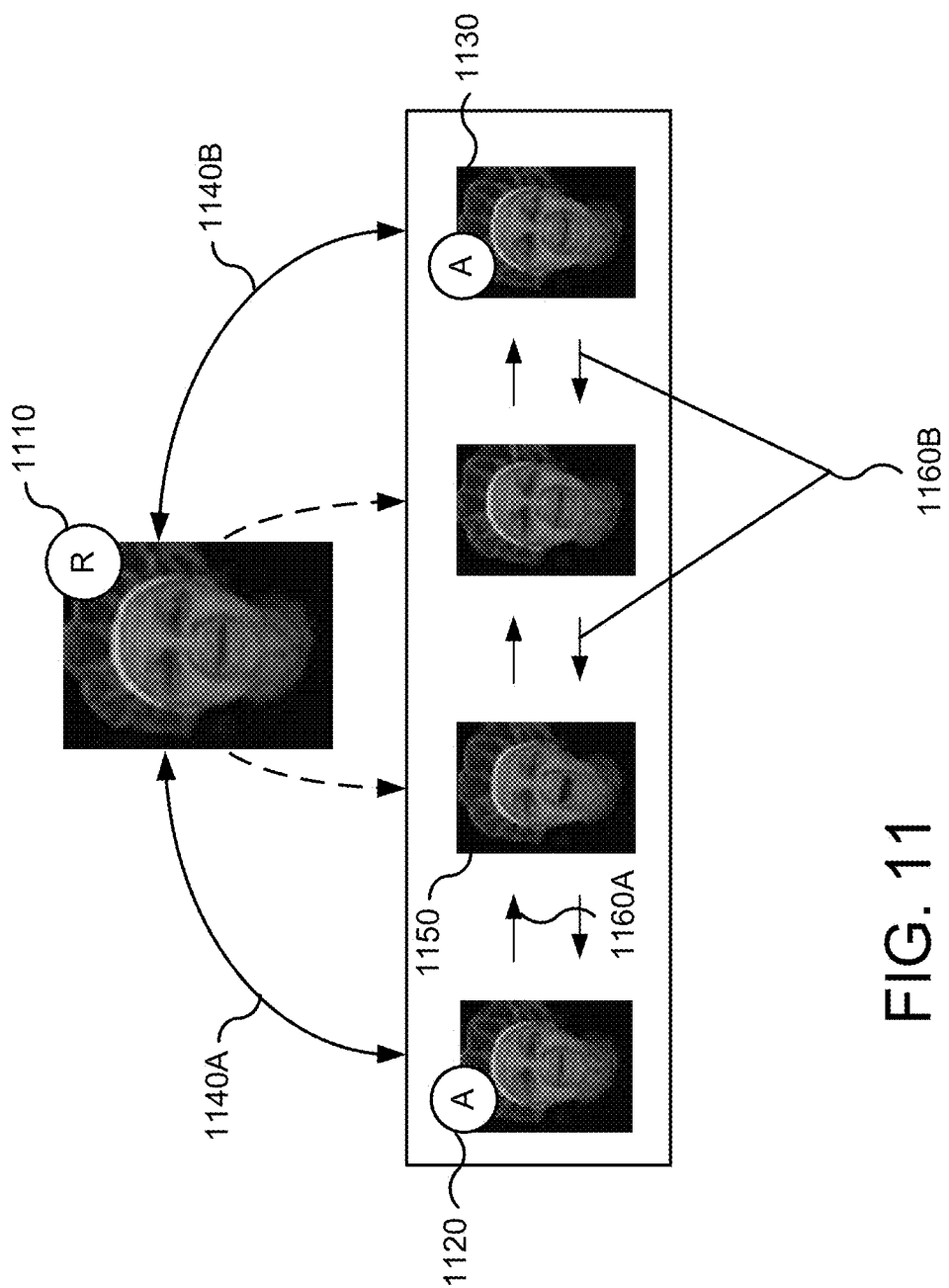
FIG. 11 is an illustration depicting a bi-directional image-space tracking in one embodiment.

FIG. 11 is an illustration depicting a bi-directional image-space tracking in one embodiment. System 100 uses reference frame 1110 to generate one or more clip each bounded by anchor frames that satisfy similarity criteria with reference frame 1110. In this example, a clip has been generated (e.g., represented by images in the rectangle) that begins with anchor frame 1120 and ends with anchor frame 1130. System 100 performs image-space tracking of feature between reference frame 1110 and each of anchor frames 1120 and 1130. Specifically, system 100 provides a forward motion estimation for features in reference frame 1110 to anchor frame 1120 and a backward motion estimation for features in anchor frame 1120 to reference frame 1110 (e.g., represented by bi-directional arrow 1140A). From these two estimations, system 100 can evaluate whether selected matches provide the best correspondences. System 100 also provides a forward motion estimation for features in reference frame 1110 to anchor frame 1130 and a backward motion estimation for features in anchor frame 1130 to reference frame 1110 (e.g., represented by bi-directional arrow 1140B). From these two estimations, system 100 can evaluate whether selected matches provide the best correspondences.

System 100 further performs image-space tracking of feature between both anchor frames 1120 and 1130 and target frame 1150. Specifically, system 100 provides a forward motion estimation for features in anchor frame 1120 to target frame 1150 using incrementally determined motion estimations in each intervening frame between anchor frame 1120 and target frame 1150 (e.g., represented by bi-directional arrow 1160A). System 100 also provides a backward motion estimation for features in anchor frame 1130 to target frame 1150 using incrementally determined motion estimations in each intervening frame between anchor frame 1130 and target frame 1150 (e.g., represented by bi-directional arrow 1160B). From these two estimations, system 100 can evaluate whether selected matches provide the best correspondences. Thus, with the anchor-based reconstruction and bi-directional image-space tracking, system 100 generates tracking information that limits temporal drift.

Figure 12:
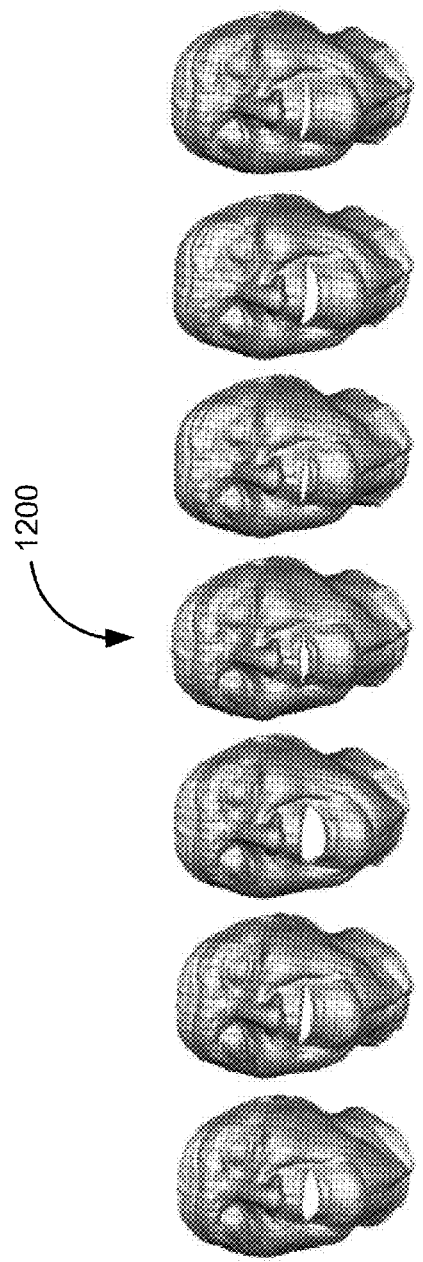
FIG. 12 is an illustration depicting a sequence of frames pulled out of different times steps of the captured performance demonstrating low temporal drift resulting from the bi-directional image-space tracking by consistent attachment of a superimposed grid pattern in one embodiment.

FIG. 12 is an illustration depicting a sequence of frames 1200 pulled out of different times steps of a captured performance demonstrating low temporal drift resulting from the bi-directional image-space tracking of system 100 by consistent attachment of a superimposed grid pattern in one embodiment.

Figure 13:
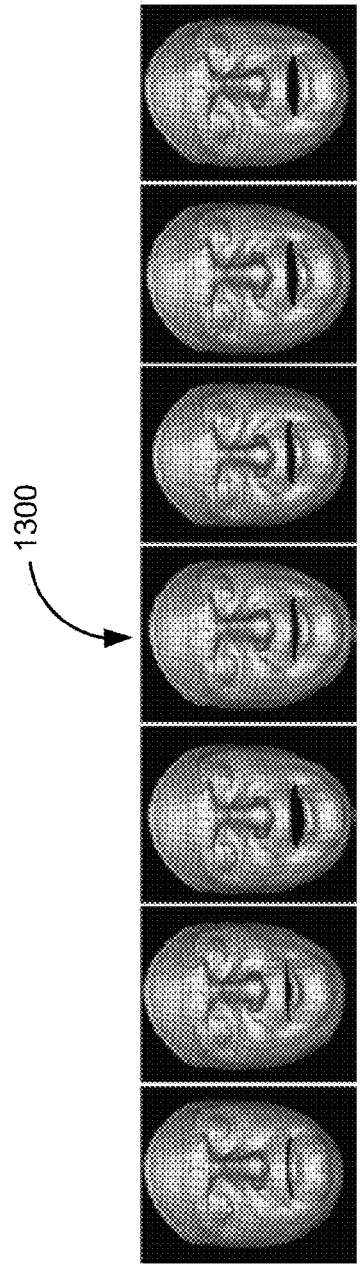
FIG. 13 is an illustration depicting another sequence of frames pulled out of different times steps of another captured performance demonstrating low temporal drift resulting from the bi-directional image-space tracking by consistent attachment of a superimposed grid pattern in one embodiment.

FIG. 13 is an illustration depicting another sequence of frames 1300 pulled out of different times steps of another captured performance demonstrating low temporal drift resulting from the bi-directional image-space tracking of system 100 by consistent attachment of a superimposed grid pattern in one embodiment.

Figure 14:
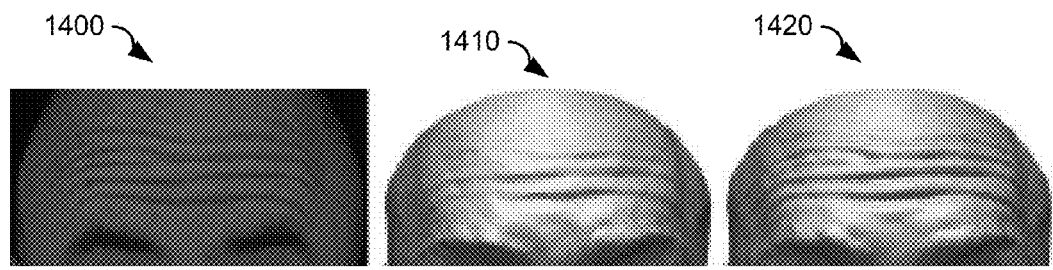
FIG. 14 depicts images of a zoom onto the forehead of an actor in an input image, a 3D reconstruction of the actor's forehead according to the prior art, and a 3D reconstruction of the actor's forehead according to one embodiment.

FIG. 14 depicts images of a zoom onto the forehead of an actor in an input image, a 3D reconstruction of the actor's forehead in the prior art, and a 3D reconstruction of the actor's forehead according to one embodiment. In this example, image 1400 depicts the forehead of the actor an represents an input image to system 100. Image 1410 depicts a 3D reconstruction of the actor's forehead with lower fidelity. Image 1420 depicts a 3D reconstruction of the actor's forehead with higher fidelity.

Figure 15:
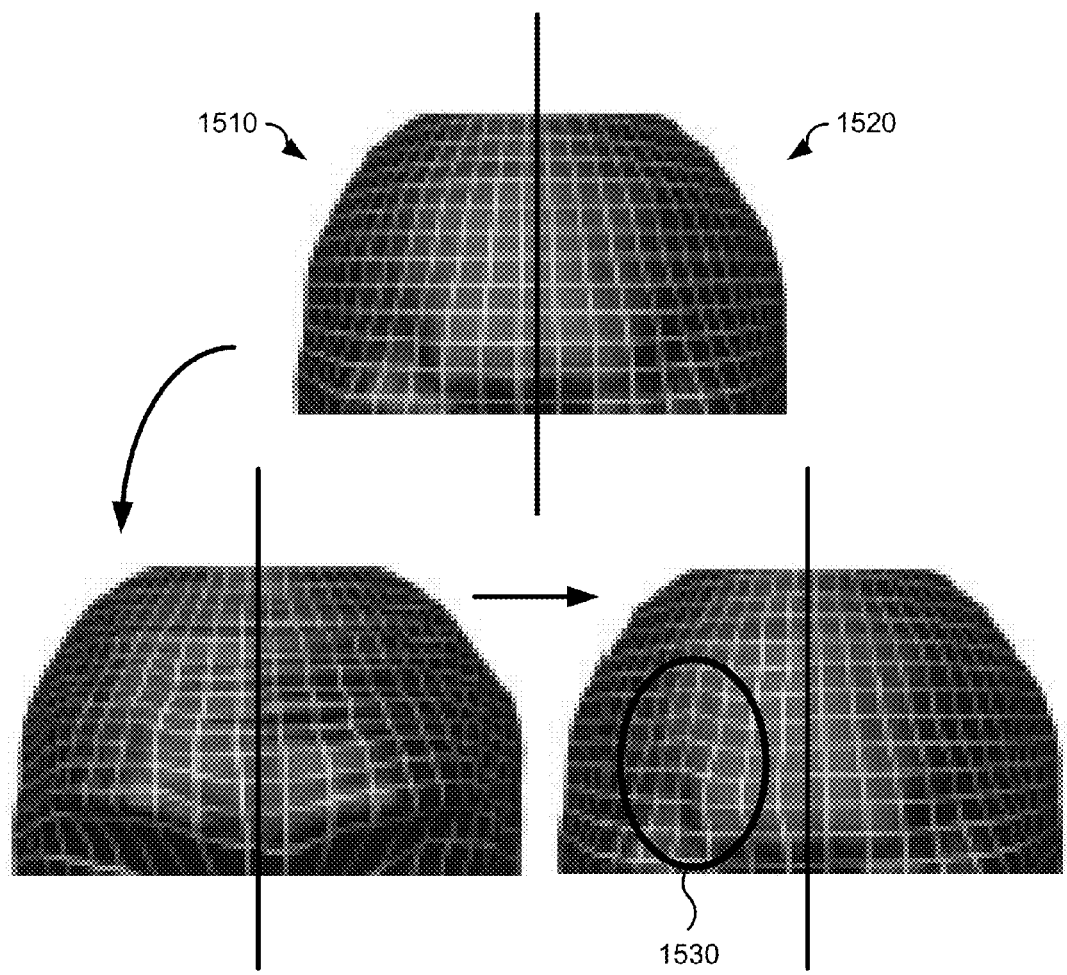
FIG. 15 depicts images of the 3D reconstructions of the actor's forehead at three time steps according to a prior art reconstruction on the left half of the images and a reconstruction according to one embodiment on the right half of the images.

FIG. 15 depicts images of the 3D reconstructions of the actor's forehead at three time steps in a prior art reconstruction on the left half of the images and a reconstruction according to one embodiment on the right half of the images. In this example, the top center image depicts an unwrinkled forehead. The bottom left image depicts a wrinkled forehead and the bottom right image depicts a transition back to an unwrinkled forehead. Changes in the attachment of a superimposed grid to the 3D reconstructions between the top center image and last images demonstrate drift in conventional tracking methods in area 1510 and drift anchor-based reconstruction and bi-directional image-space tracking showing significantly less drift in area 1520. In particular, less drift occurs vs. conventional methods as more changes are noticeable in area 1530 in the attachment of the superimposed grid to the 3D reconstructions than on the right half of the images.

Mesh Propagation

The anchor-based reconstruction and bi-directional image-space tracking, as illustrated above, can be a powerful tool for integrating multiple face performances of an actor over an extended period. A reference frame can be taken from one sequence but used to generate anchor frames in another sequence. A single mesh associated with the reference frame can be propagated across different capture sessions for the actor (including the case where camera positions or calibration may have changed somewhat between sessions) and used to embed the full corpus of facial performance data for the actor into a single coordinate frame.

Figure 16:
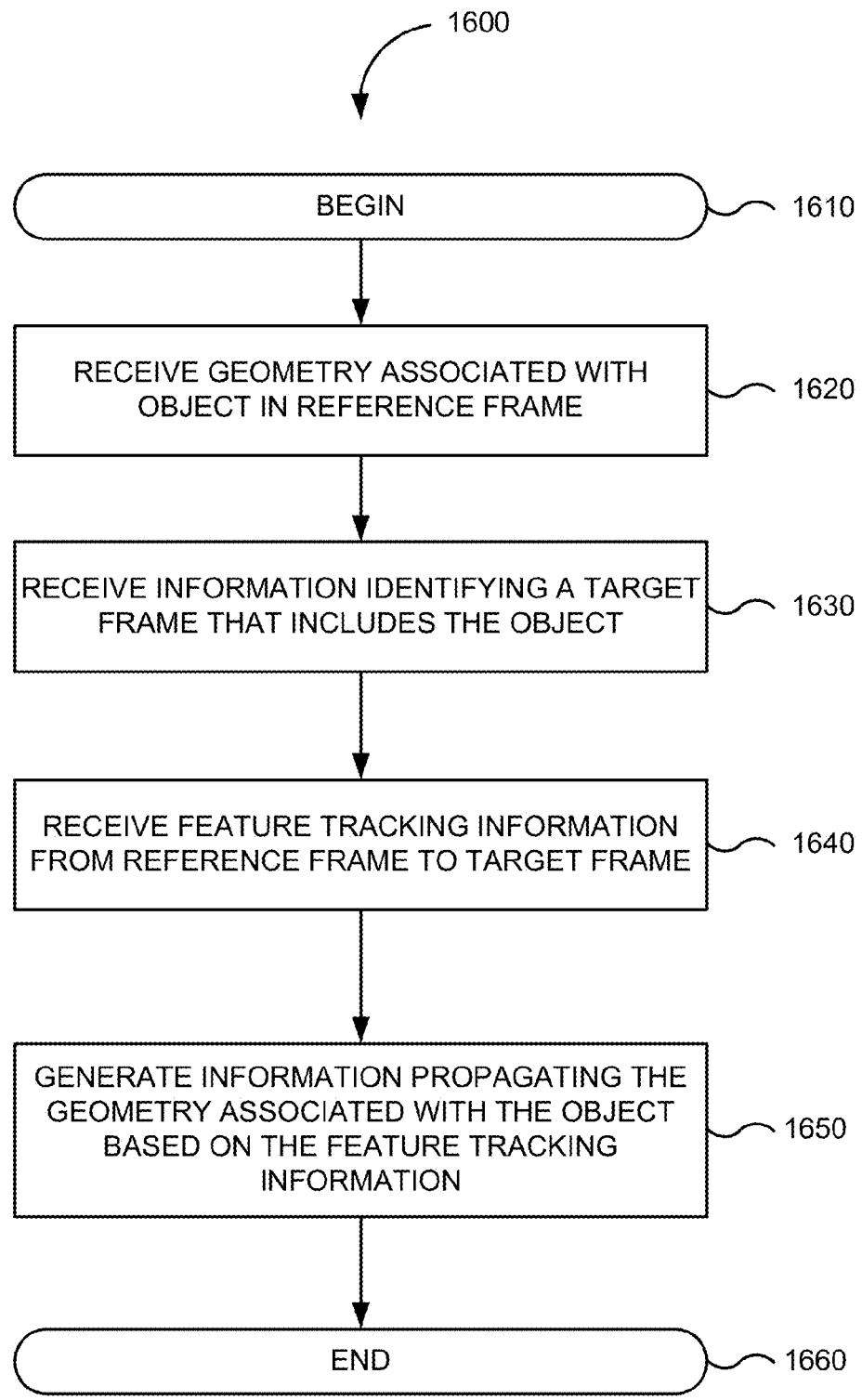
FIG. 16 is a flowchart of a method for propagating geometry corresponding to objects in a captured performance using tracking information obtained from the bi-directional image-space tracking in one embodiment.

FIG. 16 is a flowchart of method 1600 for propagating geometry corresponding to objects in a captured performance using tracking information obtained from the bi-directional image-space tracking in one embodiment. Implementations of or processing in method 1600 depicted in FIG. 16 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1600 depicted in FIG. 16 begins in step 1610.

In step 1620, geometry associated with an object in a reference frame is received. For example, one or more image-based meshing techniques may be used to extract N-dimensional object geometry from a set of one or more images. In other embodiments, one or more preconfigured or generic meshes or geometric primitives may be adapted or transformed based on object information obtained from the reference frame.

In step 1630, information is received identifying a target frame that includes the object. For example, system 100 may receive information specifying or otherwise identifying one or more anchor frames or unanchored target frames in a clip. In step 1640, feature tracking information from the reference frame to the frame target is received. For example, system 100 may determine feature tracking information from the reference frame to an anchor frame as described in FIG. 9. In another example, system 100 may determine feature tracking information from the reference frame to an unanchored frame as described in FIG. 10.

In step 1650, information propagating the geometry associated with the object in the reference frame is generated based on the feature tracking information. For example, a reference mesh $M^R$ is obtained consisting of a set of vertices $X_i^R$ for a reference frame $F^R$. Each vertex in the set of vertices $X_i^R$ for the reference frame $F^R$ represents a physical point in the reference frame $F^R$ (e.g., a point on an actor's face). In various embodiments, system 100 implements mesh propagation to a target frame $F^t$ in a sequence of frames in a clip by finding a transformed 3D position $X_j^t$ of each vertex $X_j^R$ due to any motion and deformation of an object (e.g., the actor's face) from the reference frame $F^R$ to the target frame $F^t$. In various embodiments, the feature tracking information includes motion fields from reference frame $F^R$ to the target frame $F^t$. One method for using motion fields to estimate the propagated vertices $X_j^t$, is given in [Bradley et al. 2010]. System 100 completes mesh propagation and vertices $X_j^R$ are in correspondence with vertices $X_j^t$ in the target frame $F^t$. FIG. 16 ends in step 1660.

Figure 17:
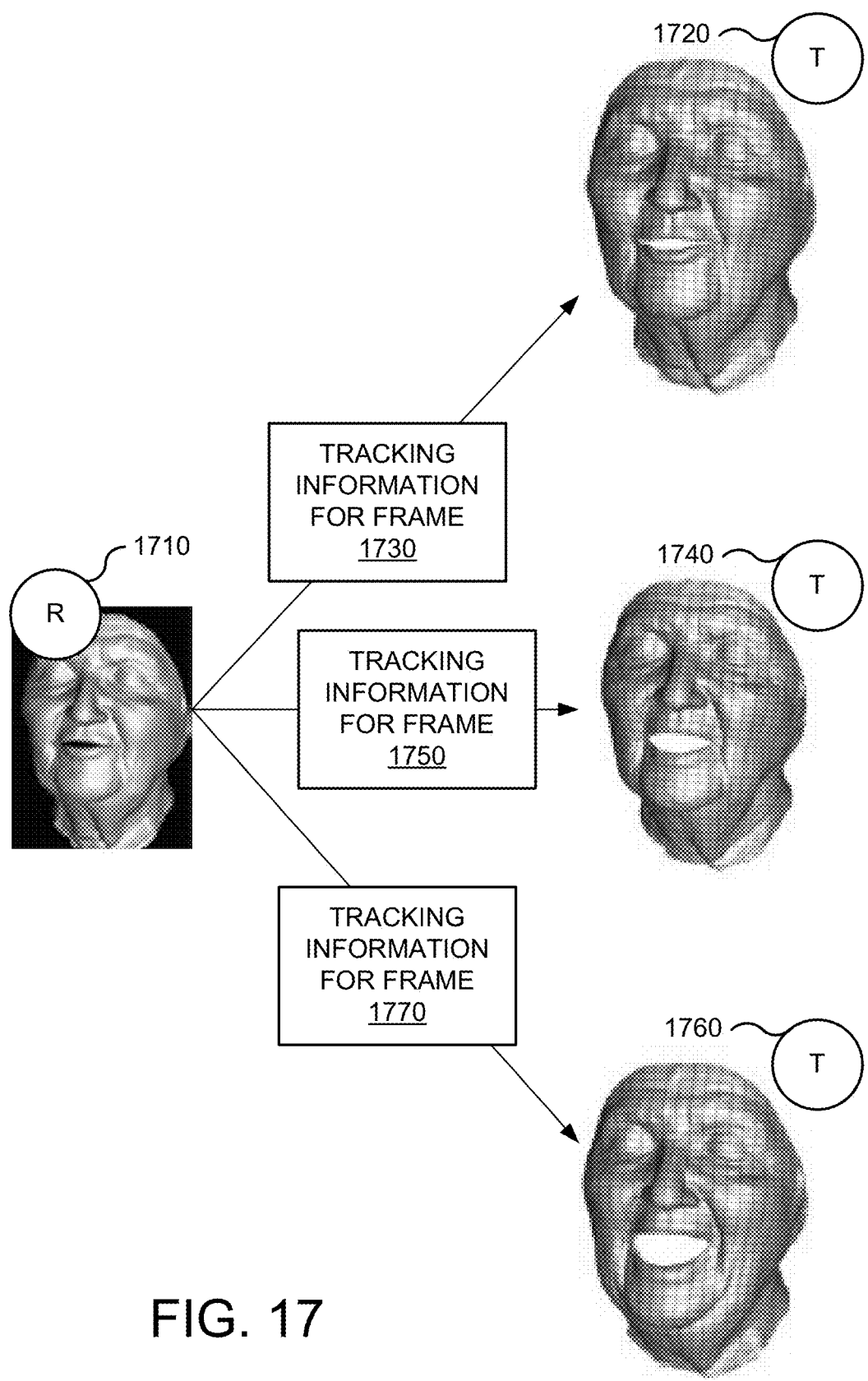
FIG. 17 is an illustration depicting how tracking information for individual frames is used to pose a mesh associated with a reference frame in one embodiment.

FIG. 17 is an illustration depicting how tracking information for individual frames is used to pose a mesh associated with a reference frame in one embodiment. In this example, a reference mesh $M^R$ is obtained consisting of a set of vertices $X_i^R$, for a reference frame 1710. System 100 propagates each vertex $X_j^R$, due to the motion and deformation of an actor's face from reference frame 1710 to target frame 1720 by finding a transformed 3D position $X_j^t$ of each vertex $X_j^R$ using feature tracking information 1730 from reference frame 1710 to target frame 1720. System 100 also propagates each vertex $X_j^R$ due to the motion and deformation of an actor's face from reference frame 1710 to target frame 1740 by finding a transformed 3D position $X_j^t$ of each vertex $X_j^R$ using feature tracking information 1750 from reference frame 1710 to target frame 1740. Further, system 100 propagates each vertex $X_j^R$, due to the motion and deformation of an actor's face from reference frame 1710 to target frame 1760 by finding a transformed 3D position $X_j^t$ of each vertex $X_j^R$ using feature tracking information 1770 from reference frame 1710 to target frame 1760.

Mesh Refinement

In the stages above, system 100 has generated a propagation of a reference mesh to each frame in a sequence of frames in a clip. This is a step closer to having temporal correspondence of meshes along the sequence. However, the propagated meshes can be computed with different methods (e.g., for anchor frames and unanchored frames) and computed independently for each timestep. In various embodiments, system 100 updates the meshes to ensure a uniform treatment in the computation of all frames and to apply temporal coherence. In some aspects, this is accomplished in two stages—a refinement that acts independently on each frame and can thus be parallelized and a refinement that aims for temporal coherence between frames.

Figure 18:
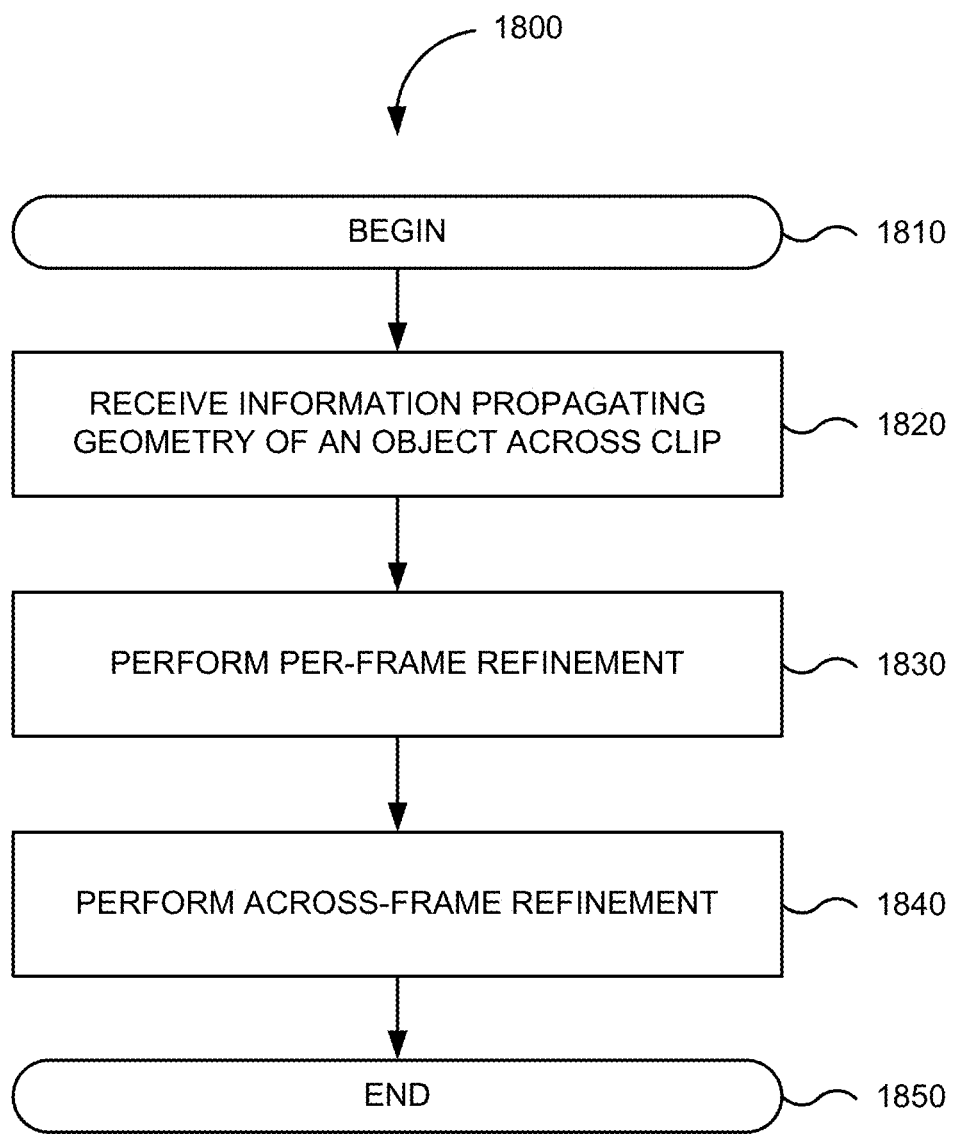
FIG. 18 is a simplified flowchart of a method for refining the propagated geometry in one embodiment.

FIG. 18 is a simplified flowchart of a method for refining the propagated geometry in one embodiment. Implementations of or processing in method 1800 depicted in FIG. 18 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1800 depicted in FIG. 18 begins in step 1810.

In step 1820, information propagating geometry of an object across a clip is received. For example, a reference mesh $M^R$ is obtained consisting of a set of vertices $X_i^R$, for a reference frame 1710 of FIG. 17. System 100 propagates each vertex $X_j^R$, due to the motion and deformation of an actor's face from reference frame 1710 to target frame 1720 by finding a transformed 3D position $X_j^t$ of each vertex $X_j^R$ using feature tracking information 1730 from reference frame 1710 to target frame 1720.

In step 1830, per-frame refinement is performed. As discussed above, this refinement acts independently on each frame and can thus be parallelized. In one aspect, information is generated that finds for one or more of the vertices in a set of vertices $X_i^R$, for a reference frame the position in space that optimizes fidelity criteria. Some examples of fidelity criteria include spatial image fidelity, temporal image fidelity, mesh fidelity, geometry smoothness, and the like. For spatial image fidelity, system 100 attempts to ensure that the reprojections in all visible cameras for a target frame $F^t$ are similar or otherwise satisfy similarity criteria. For temporal image fidelity, system 100 attempts to ensure that the reprojections in a target frame $F^t$ and a reference frame $F^R$ for each visible camera are similar or otherwise satisfy similarity criteria. For mesh fidelity, system 100 attempts to ensure that a transformed mesh $M^t$ be locally similar to a reference mesh $M^R$. For geometry smoothness, system 100 attempts to ensure that transformed geometry $G^t$ be locally smooth.

In various embodiments, to render the refinement process robust and efficient, motion and shape are treated separately as suggested in [Furukawa et al. 2009]. System 100, in some aspects, provides the refinement as an iterative process in 2.5D that interleaves motion and shape refinement.

For example, in various embodiments, system 100 refines shape along the normal. System 100 may employ the refinement framework in [Beeler et al. 2010] for shape refinement:

$$X' = (w_p X_p + w_s X_s + w_\mu X_\mu)/(w_p + w_s + w_\mu)$$

where photometric $X_p$, smooth $X_s$, and mesoscopic $X_\mu$ positions as well as the photometric $w_p$ and mesoscopic $w_\mu$ weights are the same as defined in [Beeler et al. 2010]. To produce smoother solutions in areas of higher matching error (e.g., eye-brows, nostrils, etc.), in some aspects, system 100 modifies the smoothness weight $w_s$ to be:

$$w_s = \lambda_0 + \lambda_1 \xi + \lambda_2 \xi^2$$

where $\xi$ is the matching error and $\lambda$ is a user defined smoothness coefficient vector. Some examples of $\lambda$ include [0.03, 0.7, and 1000].

In further embodiments, system 100 refines motion in a tangent plane spanned by $e_x$, $e_y$. Similar to shape refinement, system 100 may use a linear combination of a data term and a regularization term. For example, a photometric position estimate $X_p$ is the position on the tangent plane $e_x$, $e_y$ that maximizes photometric consistency between a current frame and a reference frame. System 100 uses a normalized cross-correlation as a measure of consistency and computes it by reprojecting corresponding surface patches into a reference image $I_c^R$ and a target image $I_c^t$ for all cameras c. In another example, a regularized position estimate $X_s$ assumes local rigidity of the surface and tries to preserve the local structure using Laplacian coordinates, similar to [Bradley et al. 2010].

A photometric confidence $w_p$ is the sum of the matching errors for the neighboring positions on the tangent plane:

$$w_p = 0.25(\xi_{x \pm dx, y} + \xi_{x, y \pm dy})$$

A regularized confidence $w_s$ employs a polynomial:

$$w_s = \lambda_0 + \lambda_1 \xi_{x,y} + \lambda_2 \xi_{x,y}^2$$

Some examples of $\lambda$ include [0.5, 1, and 8000].

Referring again to FIG. 18, in step 1840, across-frame refinement is performed. This refinement aims for temporal coherence between frames. As discussed above, per-frame refinement can operate on each frame independently, and can thus be run in parallel. System 100 does not guarantee the results to be temporally consistent but will be very similar by construction. While temporal error in the motion estimate is mostly not perceivable, small differences in shape between successive frames can cause large changes in surface normals, which will produce noticeable flickering in a visualization. To avoid this, system 100 performs a final pass over the complete sequence. In one embodiment, system 100 averages the Laplacian coordinates in a [−1,+1] temporal window. FIG. 18 ends in step 1850.

Performance Reconstruction Results

In several experiments, the inventors reconstructed several performances given by three different actors using the disclosed techniques. The results of these experiments cover a wide range of expressiveness, include highly-detailed pore-level geometry, and demonstrate robustness of the disclosed techniques to motion blur and occlusions, thus outperforming previous approaches.

All of datasets were acquired using seven cameras (Dalsa Falcon 4M60) capturing images with resolution 1176×864 at 42 frames per second. The actors were lit uniformly using LED-lights.

Figure 19:
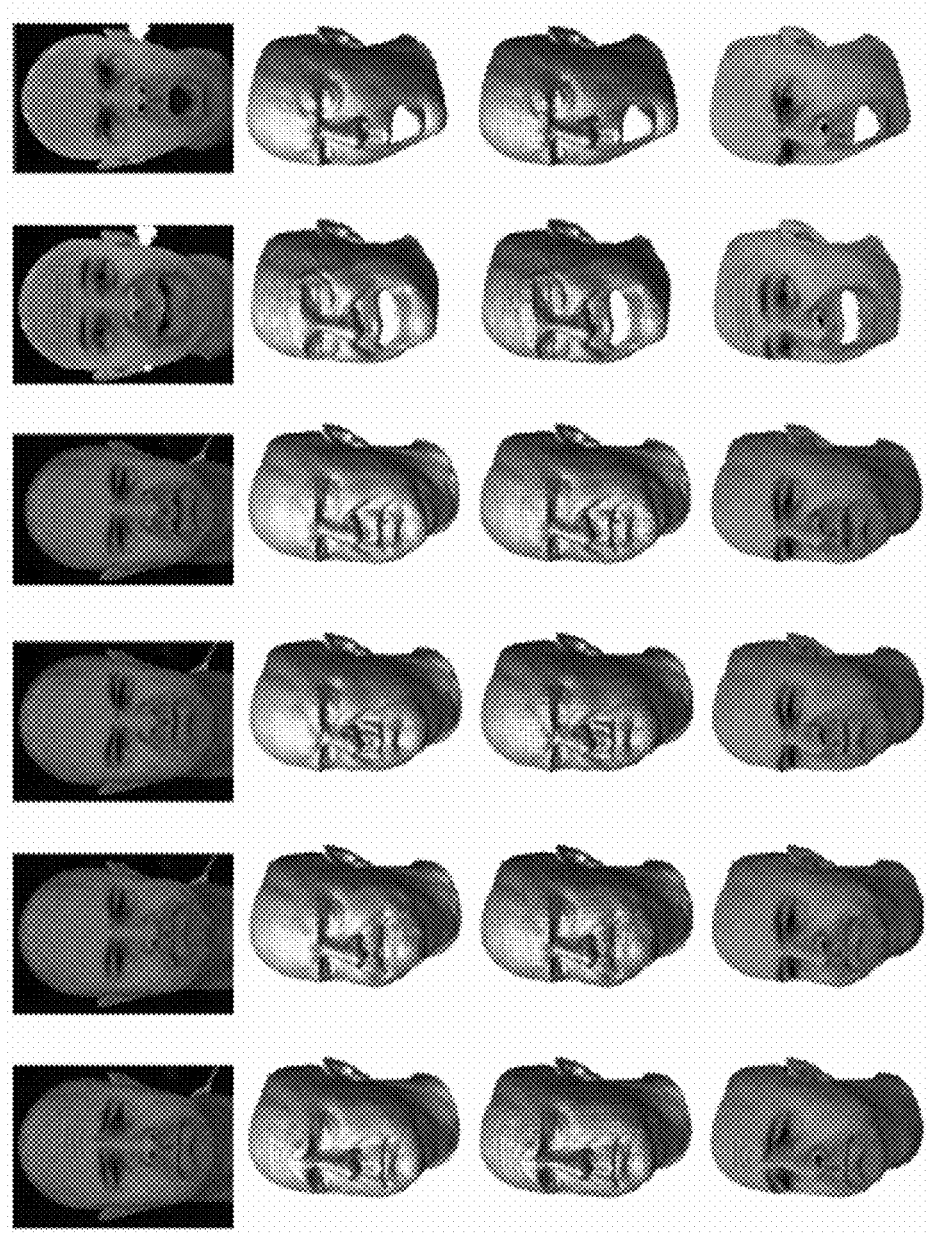
FIG. 19 depicts images of example frames taken from multiple different sequences of an actor in one embodiment.

FIG. 19 depicts images of example frames taken from multiple different sequences of an actor in one embodiment. FIG. 19 shows a number of frames from the actor, including a series of input image 1910 (first row), resulting geometry 1920 (second row), the geometry rendered with a grid pattern 1930 to show the temporal motion over time (third row), and the final result 1940 rendered using per-frame color information projected from the input images. This result, while demonstrating the expressive quality of the reconstructions, also illustrates how system 100 can match a reference frame across multiple capture sequences. Specifically, the first three expressions in FIG. 19 come from sequences that were captured on different occasions, however they are still in full vertex correspondence.

Reconstructed sequences from two additional actors are shown in previously discussed FIGS. 12 and 13 where it is shown several frames in chronological order, illustrating how the temporal reconstruction by system 100 remains faithful to the true facial motion using an overlaid grid pattern. The result in FIG. 12 particularly highlights the fine-scale spatio-temporal details that system 100 is able to produce using the disclosed techniques. By dealing with error propagation directly in image space, system 100 is able to produce more accurate motion reconstruction with less drift than techniques that rely on a potentially distorted parameterization domain for drift correction, such as the approach of [Bradley et al. 2010].

Furthermore, with the application of anchor frames system 100 addresses the problems associated with sequential motion processing, such as the unavoidable tracker drift over long sequences, and complete tracking failure caused by very fast motion or occlusions. With an anchor frame reconstruction framework, system 100 can recover from such tracking failure.

Figure 20:
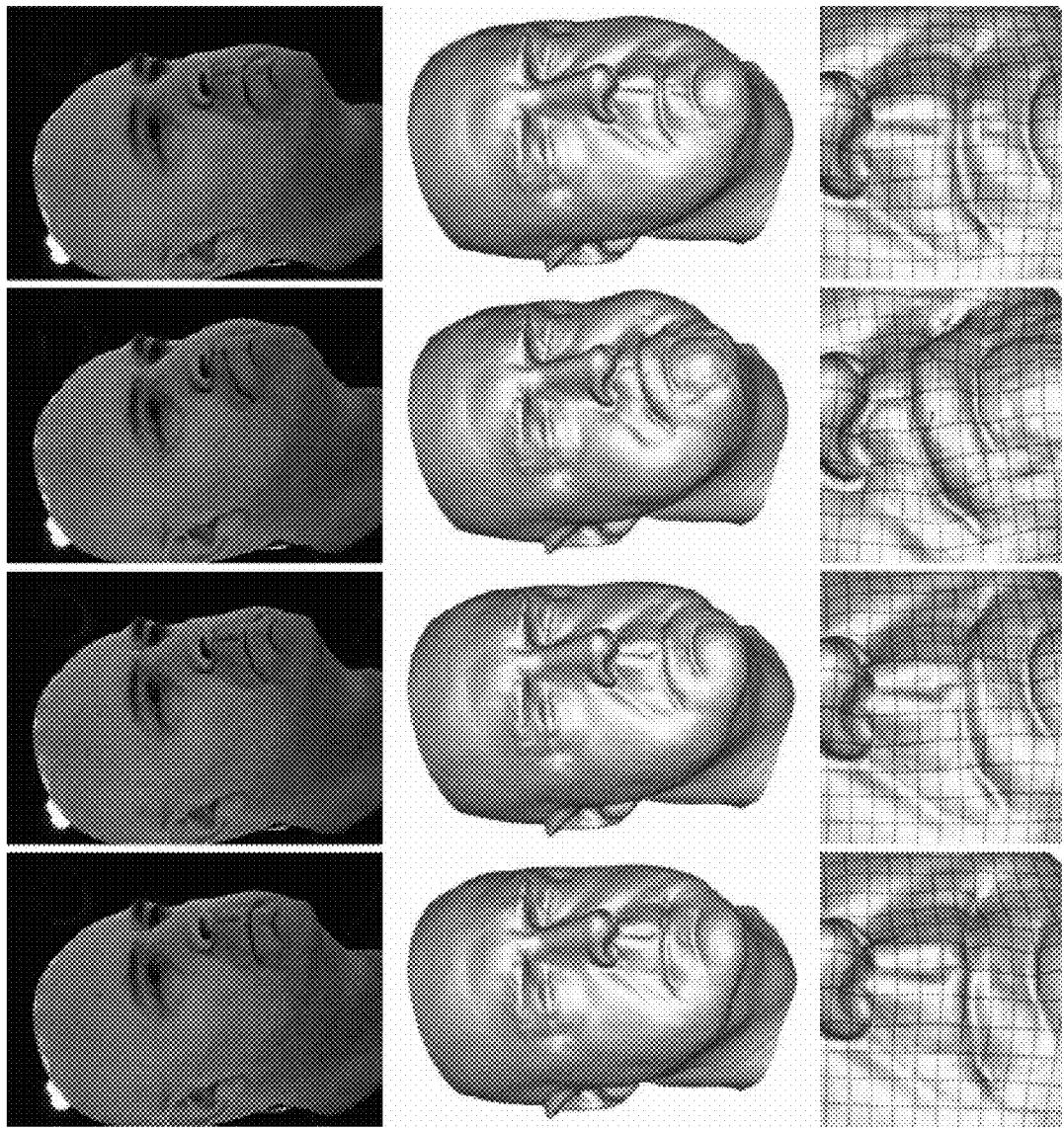
FIG. 20 depicts images of several frames from a sequence in which significant occlusion and reappearance of structure around the mouth is handled using tracking information obtained from the bi-directional image-space tracking in one embodiment.

FIG. 20 depicts images of several frames from a sequence in which significant occlusion and reappearance of structure around the mouth is handled using tracking information obtained from the bi-directional image-space tracking in one embodiment. In this example, FIG. 20 shows a sequence of lip movements in input images 2010 in which the upper lip is occluded by the lower lip in the third input image. Since tracking of the upper lip fails, system 100 may incorrectly predict that the motion of the upper lip drifts down onto the lower lip, indicated by the overlaid grid. Sequential tracking methods have trouble recovering from this situation. However, due to an anchor frame located later in the sequence, system 100 is able to successfully track the upper lip backwards from the anchor frame to the occluded frame, to automatically restore correct tracking after the occlusion. Thus, the combination of robust image space tracking and anchor frames allows us to successfully reconstruct very fast motions, even those containing motion blur.

Figure 21:
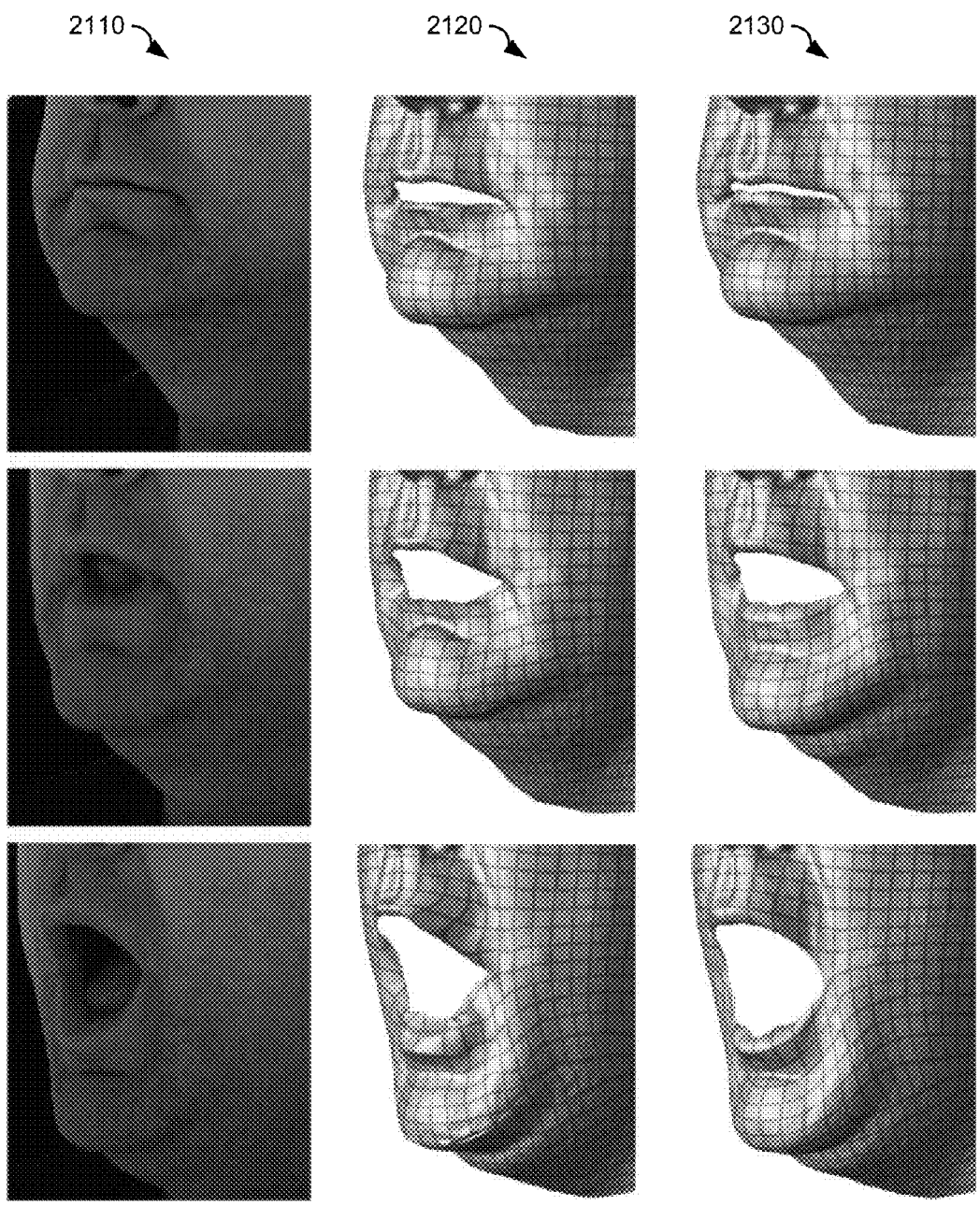
FIG. 21 depicts image of several frames from a sequence in which fast facial motion and motion blur is handled using tracking information obtained from the bi-directional image-space tracking in one embodiment.

FIG. 21 depicts image of several frames from a sequence in which fast facial motion and motion blur is handled using tracking information obtained from the bi-directional image-space tracking in one embodiment. In this example, FIG. 21 depicts a short sequence of input images 2110 in which an actor is opening his mouth very quickly. Images 2120 and 2130 compare result using the method of [Bradley et al. 2010] (center) and the disclosed techniques (right). System 100 is able to produce a more accurate reconstruction.

While some presentations of the concept of anchoring involve a single reference frame. It may happen that a given reference frame does not yield a good distribution of anchor frames in the whole sequence, so that the benefits of anchor-based reconstruction are lost in places. In this case, it is not necessary to maintain the same reference frame for the entire sequence. A subset of the sequence can be matched to one reference frame, followed by a change of the reference frame to one of the processed frames, if the switch would yield a better anchor frame distribution for the remainder of the sequence. The result shown in the latter three frames of FIG. 19 is generated in this way, where the reference frame starts off as a neutral expression and then switches to a pose with the mouth open, since the mouth remains open for most of the sequence.

Therefore, a performance capture algorithm is disclosed that can acquire expressive facial performances with pore-level geometric details. In some embodiments, image-space tracking requires a stereo deployment where all cameras capture the full face. This could be extended to a stereo deployment like that of [Bradley et al 2010], where the cameras are optically zoomed to capture small patches of the face by combining the stereo images into one image, for example using the "unwrap mosaics" method of [Rav-Acha et al. 2008].

In further embodiments, a reference frame may be matched to an anchor frames in a non-image space. In one extension, matching may be made in 3D via the meshes computed in mesh-reconstruction stage 220 of FIG. 2. Thus, matching would succeed whenever object expression is the same in the reference and anchor frames, and would no longer additionally require a similar orientation relative to the cameras.

Furthermore, anchoring can be a powerful tool for integrating multiple face performances of an actor over an extended period. As discussed above, a reference frame can be taken from one sequence but used to generate anchor frames in another sequence. This provides a way to propagate a single mesh across different capture sessions for an actor (including the case where the camera positions or calibration may have changed somewhat between the sessions), and to embed the full corpus of facial performance data for the actor into a single coordinate frame. An extension of this would be to use multiple reference frames simultaneously. For example, facial performance capture could be applied to a sequence in which an actor adapts a set of FACS poses [Ekman and Friesen 1978] with careful supervision to yield best possible results. The frames with the FACS poses could then be used as a set of high quality reference frames that could be used simultaneously when processing subsequent sequences (because the meshes have consistent triangulation).

CONCLUSION

A new passive technique has been disclosed for high-quality facial performance capture. In one aspect, a robust tracking algorithm is employed that integrates all feature tracking in image space and uses the integrated result to propagate a single reference mesh to each target frame in parallel. In another aspect, leveraging the fact that performances tend to contain repetitive motions, "anchor frames" are defined as those where the expression is similar to a reference frame. After locating the anchor frames, we compute feature tracking directly from the reference frame to anchor frames. By using the anchor frames to partition the sequence into clips and independently matching clips, tracker drift is bound with the correct handling of occlusion and motion blur. Frames can also be matched between multiple capture sessions recorded on different occasions, yielding a single deformable mesh that corresponds to every performance an actor gives.

Figure 22:
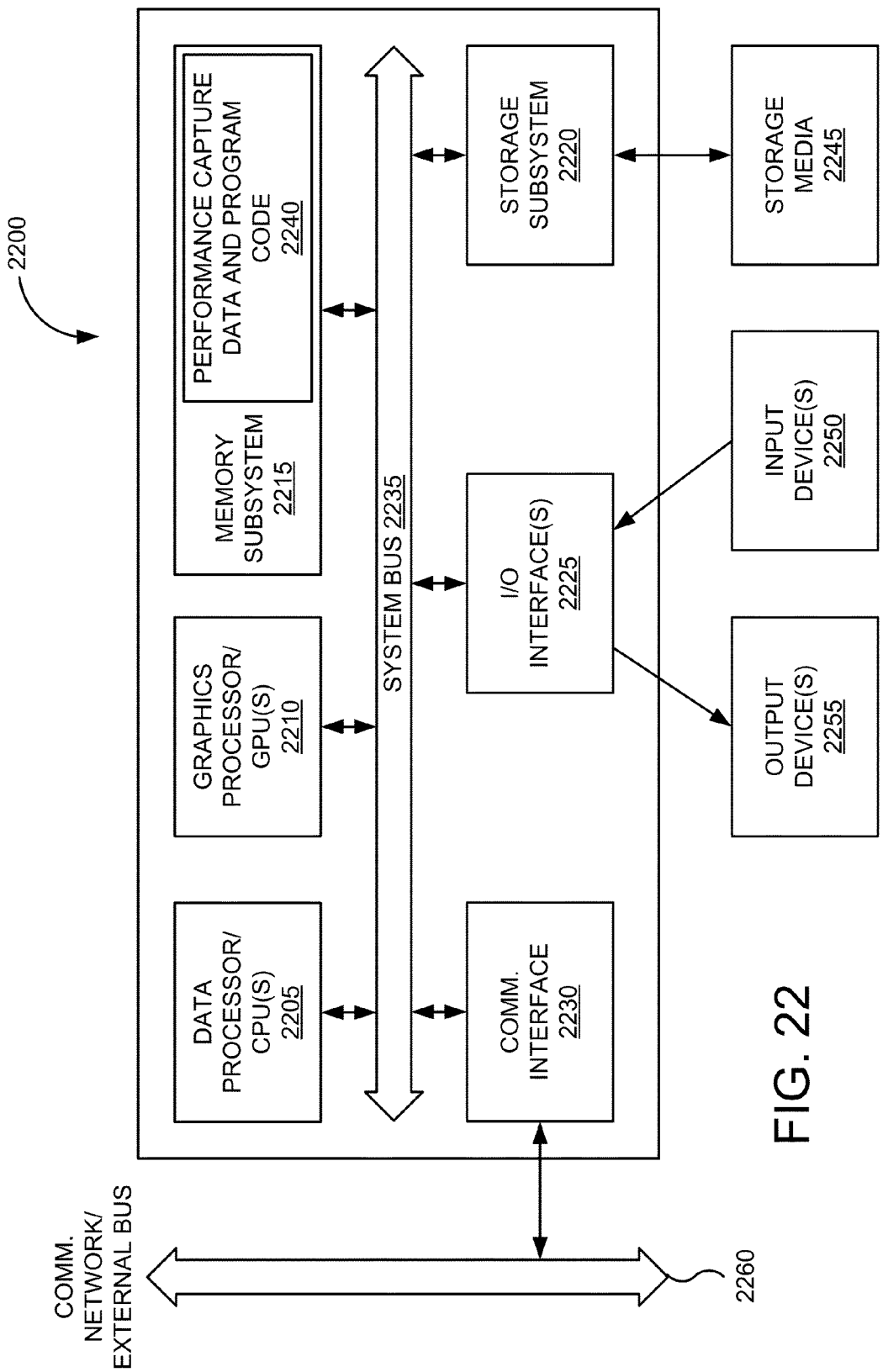
FIG. 22 is a block diagram of a computer system or information processing device that may incorporate an embodiment, be incorporated into an embodiment, or be used to practice any of the innovations, embodiments, and/or examples found within this disclosure.

FIG. 22 is a block diagram of computer system 2200 that may incorporate an embodiment, be incorporated into an embodiment, or be used to practice any of the innovations, embodiments, and/or examples found within this disclosure.

FIG. 22 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 2200 can include hardware and/or software elements configured for performing logic operations and calculations, input/output operations, machine communications, or the like. Computer system 2200 may include familiar computer components, such as one or more one or more data processors or central processing units (CPUs) 2205, one or more graphics processors or graphical processing units (GPUs) 2210, memory subsystem 2215, storage subsystem 2220, one or more input/output (I/O) interfaces 2225, communications interface 2230, or the like. Computer system 2200 can include system bus 2235 interconnecting the above components and providing functionality, such connectivity and inter-device communication. Computer system 2200 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 2205 can include hardware and/or software elements configured for executing logic or program code or for providing application-specific functionality. Some examples of CPU(s) 2205 can include one or more microprocessors (e.g., single core and multi-core) or micro-controllers. CPUs 2205 may include 4-bit, 8-bit, 12-bit, 16-bit, 32-bit, 64-bit, or the like architectures with similar or divergent internal and external instruction and data designs. CPUs 2205 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 2205 may also include one or more field-gate programmable arrays (FPGAs), application-specific integrated circuits (ASICs), or other microcontrollers. The one or more data processors or central processing units (CPUs) 2205 may include any number of registers, logic units, arithmetic units, caches, memory interfaces, or the like. The one or more data processors or central processing units (CPUs) 2205 may further be integrated, irremovably or moveably, into one or more motherboards or daughter boards.

The one or more graphics processor or graphical processing units (GPUs) 2210 can include hardware and/or software elements configured for executing logic or program code associated with graphics or for providing graphics-specific functionality. GPUs 2210 may include any conventional graphics processing unit, such as those provided by conventional video cards. Some examples of GPUs are commercially available from NVIDIA, ATI, and other vendors. In various embodiments, GPUs 2210 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 2210 may include any number of registers, logic units, arithmetic units, caches, memory interfaces, or the like. The one or more data processors or central processing units (CPUs) 2205 may further be integrated, irremovably or moveably, into one or more motherboards or daughter boards that include dedicated video memories, frame buffers, or the like.

Memory subsystem 2215 can include hardware and/or software elements configured for storing information. Memory subsystem 2215 may store information using machine-readable articles, information storage devices, or computer-readable storage media. Some examples of these articles used by memory subsystem 2270 can include random access memories (RAM), read-only-memories (ROMS), volatile memories, non-volatile memories, and other semiconductor memories. In various embodiments, memory subsystem 2215 can include performance capture data and program code 2240.

Storage subsystem 2220 can include hardware and/or software elements configured for storing information. Storage subsystem 2220 may store information using machine-readable articles, information storage devices, or computer-readable storage media. Storage subsystem 2220 may store information using storage media 2245. Some examples of storage media 2245 used by storage subsystem 2220 can include floppy disks, hard disks, optical storage media such as CD-ROMS, DVDs and bar codes, removable storage devices, networked storage devices, or the like. In some embodiments, all or part of performance capture data and program code 2240 may be stored using storage subsystem 2220.

In various embodiments, computer system 2200 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 2200 may also include one or more applications configured to execute, perform, or otherwise implement techniques disclosed herein. These applications may be embodied as performance capture data and program code 2240. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 2215 and/or storage subsystem 2220.

The one or more input/output (I/O) interfaces 2225 can include hardware and/or software elements configured for performing I/O operations. One or more input devices 2250 and/or one or more output devices 2255 may be communicatively coupled to the one or more I/O interfaces 2225.

The one or more input devices 2250 can include hardware and/or software elements configured for receiving information from one or more sources for computer system 2200. Some examples of the one or more input devices 2250 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 2250 may allow a user of computer system 2200 to interact with one or more non-graphical or graphical user interfaces to enter a comment, select objects, icons, text, user interface widgets, or other user interface elements that appear on a monitor/display device via a command, a click of a button, or the like.

The one or more output devices 2255 can include hardware and/or software elements configured for outputting information to one or more destinations for computer system 2200. Some examples of the one or more output devices 2255 can include a printer, a fax, a feedback device for a mouse or joystick, external storage systems, a monitor or other display device, a communications interface appropriately configured as a transceiver, or the like. The one or more output devices 2255 may allow a user of computer system 2200 to view objects, icons, text, user interface widgets, or other user interface elements.

A display device or monitor may be used with computer system 2200 and can include hardware and/or software elements configured for displaying information. Some examples include familiar display devices, such as a television monitor, a cathode ray tube (CRT), a liquid crystal display (LCD), or the like.

Communications interface 2230 can include hardware and/or software elements configured for performing communications operations, including sending and receiving data.

Some examples of communications interface 2230 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 2230 may be coupled to communications network/external bus 2280, such as a computer network, to a FireWire bus, a USB hub, or the like. In other embodiments, communications interface 2230 may be physically integrated as hardware on a motherboard or daughter board of computer system 2200, may be implemented as a software program, or the like, or may be implemented as a combination thereof.

In various embodiments, computer system 2200 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 2200.

As suggested, FIG. 22 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

What is claimed is:

1. A method for manipulating computer-generated objects, the method comprising:
   receiving a time-based sequence of a plurality of images;
   identifying a plurality of anchor frames within the time-based sequence of the plurality of images;
   selecting a subset of images of the time-based sequence of the plurality of images, wherein the subset of images is bounded by a first anchor image and a second anchor image;
   generating, with one or more processors associated with the computer system, tracking information for a third image in the plurality of images based on how a first portion of an actor's face in the first anchor image corresponds in image space to the first portion of the actor's face in the third image and how the first portion of the actor's face in the second anchor image corresponds in image space to the second portion of the actor's face in the third image, wherein generating the tracking information for the third image comprises:
      determining a first error associated with how the first portion of the actor's face in the first image corresponds in image space to the first portion of the actor's face in the third image;
      determining a second error associated with how the first portion of the actor's face in the second image corresponds in image space to the second portion of the actor's face in the third image; and
      identifying on which of the first image and the second image to base in part the tracking information for the third image in response to a comparison between the first error and the second error;
   generating, with the one or more processors associated with the computer system, information that manipulates a computer-generated object based on the tracking information for the third image to reflect a selected portion of the actor's face in the third image; and
   storing the information that manipulates the computer-generated object in a storage device associated with the one or more computer system.

2. The method of claim 1 wherein generating, with the one or more processors associated with the computer system, the tracking information for the third image comprises:
   determining how the first portion of the actor's face in the first image corresponds incrementally in image space to a portion of the actor's face in each image in a set of images in the plurality of images that occur in a sequence of images in-between the first image and the third image; and
   determining, with the one or more processors associated with the computer system, how the first portion of the actor's face in the second image corresponds incrementally in image space to a portion of the actor's face in each image in of a set of images in the plurality of images that occur in a sequence of images in-between the second image and the third image.

3. The method of claim 1 wherein the second image satisfies similarity criteria associated with the first image.

4. The method of claim 1 wherein the first image and the second image satisfy similarity criteria associated with a reference image of the actor.

5. The method of claim 1 further comprising:
   generating, with the one or more processors associated with the computer system, tracking information for the first image in the plurality of images based on how a first portion of the actor's face in a reference image of the actor corresponds in image space to a second portion of the actor's face in the first image;
   generating, with the one or more processors associated with the computer system, tracking information for the second image in the plurality of images based on how a second portion of the predetermined image of the actor corresponds in image space to a second portion of the actor's face in the second image; and generating, with the one or more processors associated with the computer system, the tracking information for the third image further based on at least one of the tracking information for the first image and the tracking information for the second image.

6. The method of claim 5 wherein generating the tracking information for the first image or the second image comprises a bi-directional comparison to and from one or more portions of the actor's face in the reference image of the actor.

7. A method for manipulating computer-generated objects, the method comprising:

receiving a time-based sequence of a plurality of images;

identifying a plurality of anchor frames within the time-based sequence of the plurality of images;

selecting a subset of images of the time-based sequence of the plurality of images, wherein the subset of images is bounded by a first anchor image and a second anchor image;

generating, with one or more processors associated with the computer system, tracking information for a third image in the plurality of images based on how a first portion of an actor's face in the first anchor image corresponds in image space to the first portion of the actor's face in the third image and how the first portion of the actor's face in the second anchor image corresponds in image space to the second portion of the actor's face in the third image;

generating, with the one or more processors associated with the computer system, information that manipulates a computer-generated object based on the tracking information for the third image to reflect a selected portion of the actor's face in the third image;

storing the information that manipulates the computer-generated object in a storage device associated with the one or more computer system;

identifying, with the one or more processors associated with the computer system, a first set of features in the first image;

identifying, with the one or more processors associated with the computer system, a first set of features in the third image that corresponds to the first set of features in the first image;

generating, with the one or more processors associated with the computer system, information indicative of how the first portion of the actor's face in the first image corresponds in image space to the first portion of the actor's face in the third image based on the first set of features in the third image that corresponds to the first set of features in the first image;

identifying, with the one or more processors associated with the computer system, a first set of features in the second image;

identifying, with the one or more processors associated with the computer system, a second set of features in the third image that corresponds to the first set of features in the second image; and generating, with the one or more processors associated with the computer system, information indicative of how the first portion of the actor's face in the second image corresponds in image space to the second portion of the actor's face in the third image based on the second set of features in the third image that corresponds to the first set of features in the second image.

8. The method of claim 7 wherein identifying the first set of features in the first image or the second image comprises identifying one or more of a pixel, an image structure, a geometric structure, or a facial structure.

9. The method of claim 1 further comprising:

receiving, at the computer system, criteria configured to designate images as being similar to a reference image of the actor;

receiving, at the computer system, a sequence of images; and generating, with the one or more processors associated with the computer system, the plurality of images as a clip bounded by the first image and the second image based on the criteria configured to designate images as being similar to the reference image of the actor.

10. The method of claim 1 wherein generating, with the one or more processors associated with the computer system, the information that manipulates the computer-generated object to reflect the selected portion of the actor's face in the third image comprises generating information configured to propagate a mesh from a first configuration to a second configuration.

11. The method of claim 1 further comprising modifying, with the one or more processors associated with the computer system, the information that manipulates the computer-generated object in response to shape information associated with one or more portions of the actor's face in the third image.

12. The method of claim 1 further comprising modifying, with the one or more processors associated with the computer system, the information that manipulates the computer-generated object in response to a measure of temporal coherence over a set of two or more images in the plurality of images that includes the third image.

13. A non-transitory computer-readable medium storing computer-executable code for manipulating computer-generated objects, the non-transitory computer-readable medium comprising:

code for receiving a time-based sequence of a plurality of images;

code for identifying a plurality of anchor frames within the time-based sequence of the plurality of images;

code for selecting a subset of images of the time-based sequence of the plurality of images, wherein the subset of images is bounded by a first anchor image and a second anchor image;

code for generating tracking information for a third image in the plurality of images based on how a first portion of an actor's face in the first anchor image corresponds in image space to the first portion of the actor's face in the third image and how the first portion of the actor's face in the second anchor image corresponds in image space to a second portion of the actor's face in the third image, wherein the code for generating the tracking information for the third image comprises:

code for determining a first error associated with how the first portion of the actor's face in the first image corresponds in image space to the first portion of the actor's face in the third image;

code for determining a second error associated with how the first portion of the actor's face in the second image corresponds in image space to the second portion of the actor's face in the third image; and code for identifying on which of the first image and the second image to base in part the tracking information for the third image in response to a comparison between the first error and the second error; and code for generating information that manipulates a computer-generated object based on the tracking information for the third image to reflect a selected portion of the actor's face in the third image.

14. The non-transitory computer-readable medium of claim 13 wherein the code for generating the tracking information for the third image comprises:
   code for determining how the first portion of the actor's face in the first image corresponds incrementally in image space to a portion of the actor's face in each image in a set of images in the plurality of images that occur in a sequence of images in-between the first image and the third image; and
   code for determining how the first portion of the actor's face in the second image corresponds incrementally in image space to a portion of the actor's face in each image in of a set of images in the plurality of images that occur in a sequence of images in-between the second image and the third image.

15. A non-transitory computer-readable medium storing computer-executable code for manipulating computer-generated objects, the non-transitory computer-readable medium comprising:
   code for receiving a time-based sequence of a plurality of images;
   code for identifying a plurality of anchor frames within the time-based sequence of the plurality of images;
   code for selecting a subset of images of the time-based sequence of the plurality of images, wherein the subset of images is bounded by a first anchor image and a second anchor image;
   code for generating tracking information for the first image in the plurality of images based on how a first portion of the actor's face in a reference image of the actor corresponds in image space to a second portion of the actor's face in the first image;
   code for generating tracking information for the second image in the plurality of images based on how a second portion of the predetermined image of the actor corresponds in image space to a second portion of the actor's face in the second image, wherein the code for generating the tracking information for the first image or the second image comprises a bi-directional comparison to and from one or more portions of the actor's face in the reference image of the actor; and
   code for generating tracking information for a third image in the plurality of images based on how a first portion of an actor's face in the first anchor image corresponds in image space to the first portion of the actor's face in the third image, how the first portion of the actor's face in the second anchor image corresponds in image space to a second portion of the actor's face in the third image, and at least one of the tracking information for the first image and the tracking information for the second image; and
   code for generating information that manipulates a computer-generated object based on the tracking information for the third image to reflect a selected portion of the actor's face in the third image.

16. The non-transitory computer-readable medium of claim 13 further comprising:
   code for identifying a first set of features in the first image;
   code for identifying a first set of features in the third image that corresponds to the first set of features in the first image;
   code for generating information indicative of how the first portion of the actor's face in the first image corresponds in image space to the first portion of the actor's face in the third image based on the first set of features in the third image that corresponds to the first set of features in the first image;
   code for identifying a first set of features in the second image;
   code for identifying a second set of features in the third image that corresponds to the first set of features in the second image; and
   code for generating information indicative of how the first portion of the actor's face in the second image corresponds in image space to the second portion of the actor's face in the third image based on the second set of features in the third image that corresponds to the first set of features in the second image.

17. The non-transitory computer-readable medium of claim 16 wherein the code for identifying the first set of features in the first image or the second image comprises code for identifying one or more of a pixel, an image structure, a geometric structure, or a facial structure.

18. The non-transitory computer-readable medium of claim 13 further comprising:
   code for receiving criteria configured to designate images as being similar to a reference image of the actor;
   code for receiving a sequence of images; and
   code for generating the plurality of images as a clip bounded by the first image and the second image based on the criteria configured to designate images as being similar to the reference image of the actor.

19. The non-transitory computer-readable medium of claim 13 wherein the code for generating the information that manipulates the computer-generated object to reflect the selected portion of the actor's face in the third image comprises code for generating information configured to propagate a mesh from a first configuration to a second configuration.

20. The non-transitory computer-readable medium of claim 13 further comprising code for modifying the information that manipulates the computer-generated object in response to shape information associated with one or more portions of the actor's face in the third image.

21. The non-transitory computer-readable medium of claim 13 further comprising code for modifying the information that manipulates the computer-generated object in response to a measure of temporal coherence over a set of two or more images in the plurality of images that includes the third image.

* * * * *

UNITED STATES PATENT AND TRADEMARK OFFICE
CERTIFICATE OF CORRECTION

PATENT NO.         : 9,036,898 B1  
APPLICATION NO.    : 13/287774  
DATED              : May 19, 2015  
INVENTOR(S)        : Beeler et al.

Page 1 of 1

It is certified that error appears in the above-identified patent and that said Letters Patent is hereby corrected as shown below:

On the title page item [73]

insert --ETH Zürich (Eidgenössische Technische Hochschule Zürich), Zürich (CH)--

Signed and Sealed this  
Fifteenth Day of December, 2015

Michelle K. Lee  
*Director of the United States Patent and Trademark Office*